(12) United States Patent
Shah et al.

(10) Patent No.: US 6,429,567 B1
(45) Date of Patent: Aug. 6, 2002

(54) POWER GENERATOR

(75) Inventors: Manoj Ramprasad Shah, Latham; Sameh Ramadan Salem, Rexford; Ronald Irving Longwell, Ballston Lake, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/748,911

(22) Filed: Dec. 27, 2000

(51) Int. Cl.[7] .................................................. H02K 1/12
(52) U.S. Cl. ........................ 310/197; 310/258; 310/259; 310/64
(58) Field of Search ................................ 310/254, 256, 310/258, 259, 217, 91, 197, 64

(56) References Cited

U.S. PATENT DOCUMENTS

| | | | |
|---|---|---|---|
| 3,987,325 A | * | 10/1976 | Wilson et al. ............... 310/197 |
| 5,869,912 A | | 2/1999 | Andrew et al. |
| 6,025,666 A | | 2/2000 | Kliman |
| 6,104,116 A | | 8/2000 | Fuller et al. |
| 6,127,761 A | | 10/2000 | Shen et al. |

FOREIGN PATENT DOCUMENTS

| JP | 57-78334 | * | 5/1982 | ............ H02K/1/18 |
|---|---|---|---|---|

* cited by examiner

Primary Examiner—Burton S. Mullins
(74) Attorney, Agent, or Firm—Banner & Witcoff

(57) ABSTRACT

A thermal control and keybar voltage differential reduction mechanism is provided for use in a power generator having multiple keybars that are each coupled to a flange. The mechanism includes an electrically conductive coupler capable of being electrically coupled to each of a first keybar and a second keybar of the multiple keybars. The coupler facilitates a flow of a current from the first keybar to the second keybar in response to a rotation of a rotor of the power generator, shunting the current away from the flange and producing a first magnetic field that opposes a second magnetic field induced by the rotation of the rotor.

45 Claims, 14 Drawing Sheets

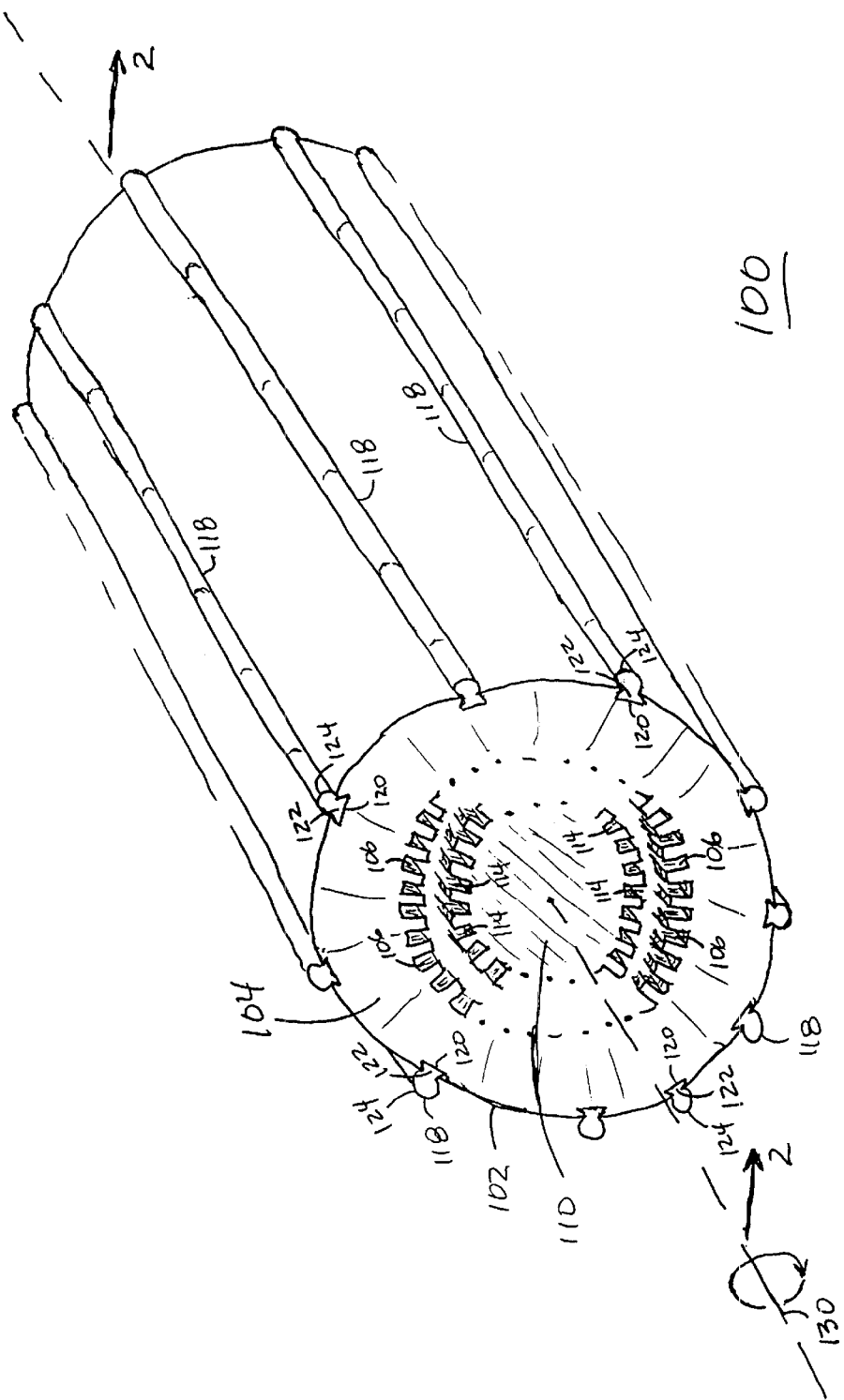
— PRIOR ART — FIG. 1

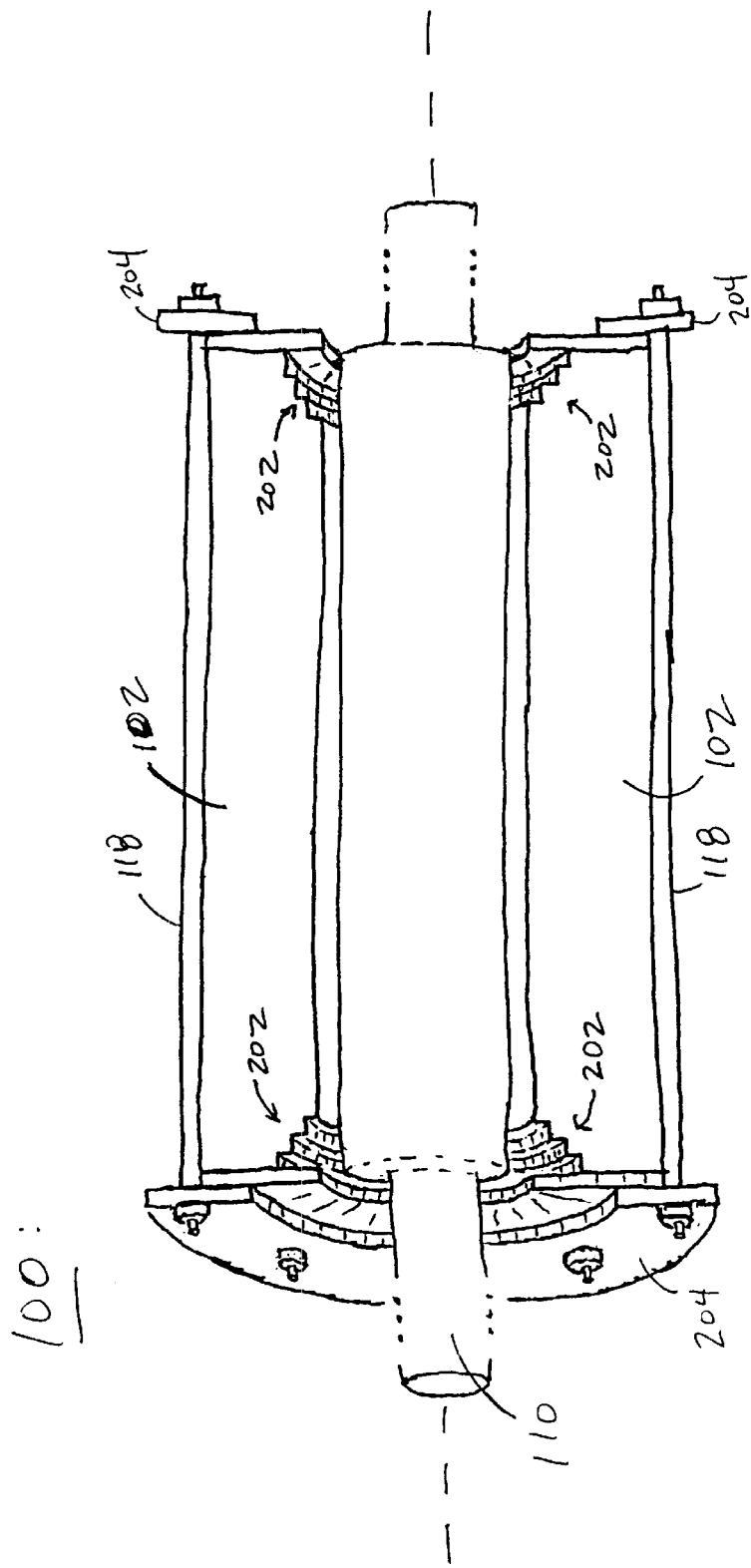
FIG. 2 — PRIOR ART —

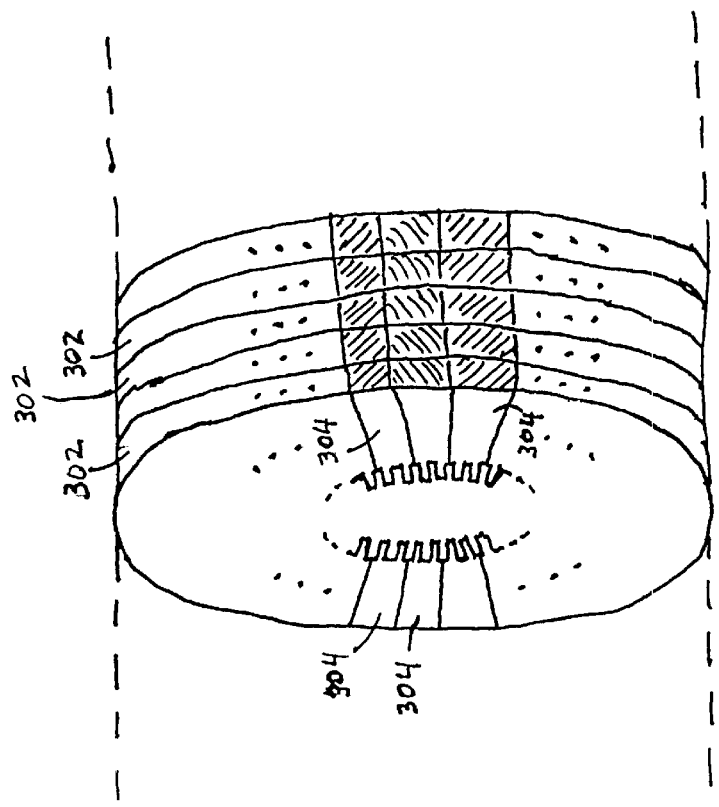
FIG. 3 — PRIOR ART —

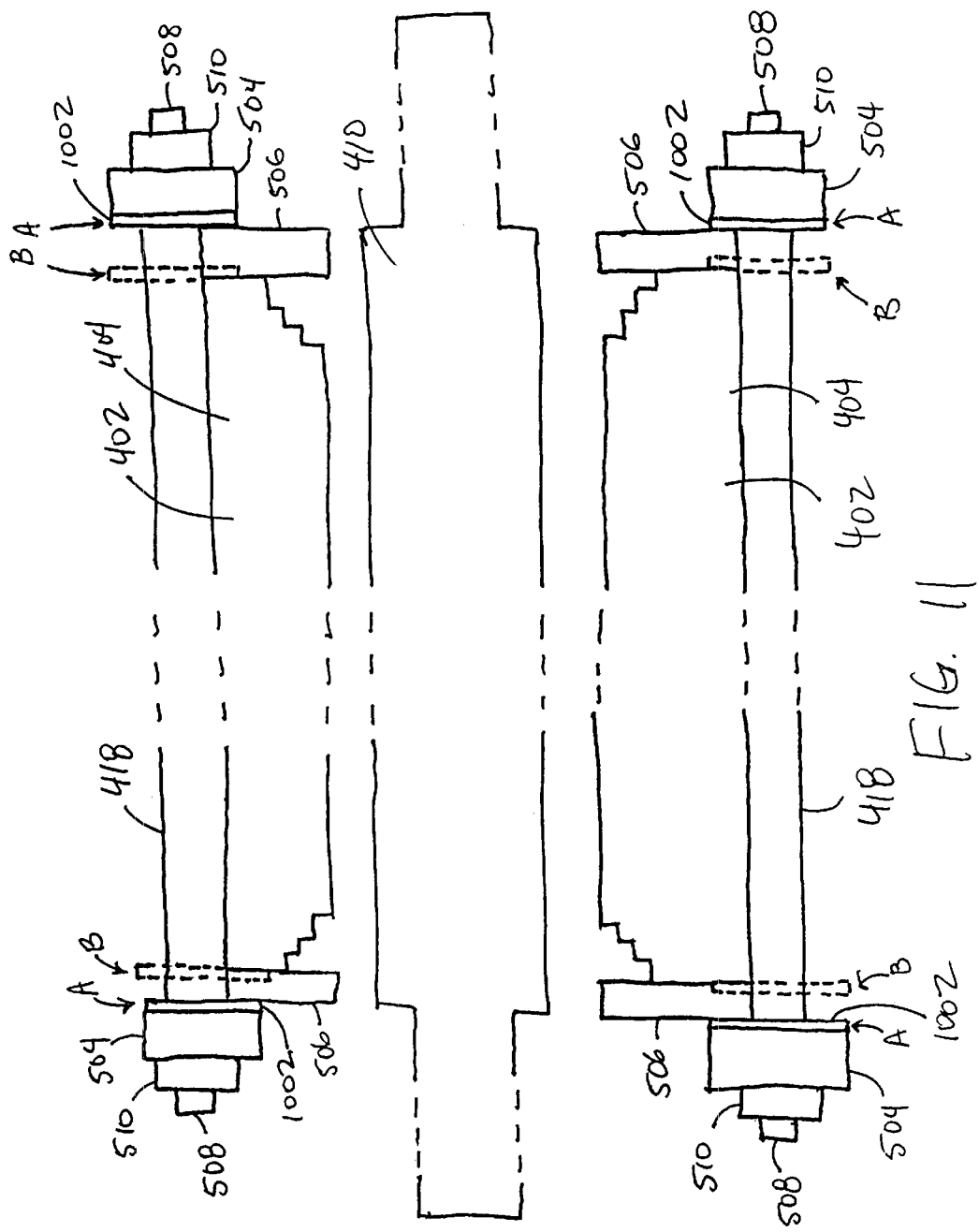

POWER GENERATOR

BACKGROUND OF THE INVENTION

The invention relates generally to a power generator, and in particular to reduction of heat dissipation and undesirable voltage differentials in a power generator.

In order to improve generator efficiency and reduce generator size, high power electrical generator manufacturers are constantly endeavoring to improve generator thermal performance and efficiency. For example, a prior art design of a high power electrical generator 100 is illustrated in FIGS. 1 and 2. FIG. 1 is an end view of a cross-section of power generator 100 from an isometric perspective. FIG. 2 is a cut-away view of power generator 100 along axis 2-2. As shown in FIGS. 1 and 2, power generator 100 includes a substantially cylindrical stator 102 housing a substantially cylindrical rotor 110. Power generator 100 further includes multiple axially oriented keybars 118 that are circumferentially distributed around an outer surface of the stator 102. Each keybar 118 is mechanically coupled to the outer surface of stator 102. Each keybar 118 is further mechanically coupled at each of a proximal end and a distal end to one of multiple flanges 204 (not shown in FIG. 1). The multiple keybars 118, together with the multiple flanges 204, form a keybar cage around the stator 102.

An inner surface of stator 102 includes multiple stator slots 106 that are circumferentially distributed around an inner surface of stator 102. Each stator slot 106 is radially oriented and longitudinally extends approximately a full length of stator 102. Each stator slot 106 receives an electrically conductive stator winding (not shown).

Rotor 110 is rotatably disposed inside of stator 102. An outer surface of rotor 110 includes multiple rotor slots 114 that are circumferentially distributed around the outer surface of rotor 110. Each rotor slot 114 is radially oriented and longitudinally extends approximately a full length of rotor 110. An air gap exists between stator 102 and rotor 110 and allows for a peripheral rotation of rotor 110 about axis 130.

Each rotor slot 114 receives an electrically conductive rotor winding (not shown). Each rotor winding typically extends from a proximal end of rotor 110 to a distal end of the rotor in a first rotor slot 114, and then returns from the distal end to the proximal end in a second rotor slot 114, thereby forming a loop around a portion of the rotor. When a direct current (DC) voltage differential is applied across a rotor winding at the proximal end of rotor 110, an electrical DC current is induced in the winding.

Similar to the rotor windings, each stator winding typically extends from a proximal end of stator 102 to a distal end of the stator in a first stator slot 106, and then returns from the distal end of the stator to the proximal of the stator in a second stator slot 106, thereby forming a stator winding loop. A rotation of rotor 110 inside of stator 102 when a DC current is flowing in the multiple windings of rotor 110 induces electromagnetic fields in, and a passage of magnetic flux through, stator 102 and the loops of stator windings. The passage of magnetic flux through the stator windings induces a current in the stator windings and a power generator output voltage. The passage of magnetic flux through stator 102 induces eddy currents in the magnetically and electrically resistive stator. The eddy currents cause the dissipation of energy in stator 102 in the form of heat and impose a thermal constraint on the operation of generator 100.

FIG. 3 is a partial perspective of generator of 100 and illustrates a typical technique of constructing stator core 104. One known thermal management technique is the construction of stator core 104 from multiple ring-shaped laminations 302. As shown in FIG. 3, the multiple ring-shaped laminations 302 are stacked one on top of another in order to build up stator core 104. Each lamination 302 is divided into multiple lamination segments 304. Each lamination segment 304 includes multiple slots 120 (not shown in FIG. 3), wherein at least one slot 120 of each segment 304 aligns with one of the multiple keybars 118. Each keybar in turn includes an outer side 124 and an inner, or locking, side 122 that mechanically mates with one of the multiple slots 120. Stator core 104 is then constructed by sliding each lamination segment 304, via one of the multiple slots 120, into the keybar cage formed by the multiple keybars 118. The coupling of one of the multiple slots 120 of a lamination segment 304 with a locking side 122 of a keybar 118 affixes each lamination segment 304, and thereby each lamination 302, in position in stator 102. By building stator core 104 from stacked laminations 302, as opposed to constructing a solid core, circulation of a current induced in stator 102 is limited to a lamination, thereby restricting current circulation and size and concomitantly reducing stator heating. However, the above thermal management technique does not fully address the thermal problems caused by the coupling of magnetic fields into stator 102.

Furthermore, induced magnetic flux also passes through, and spills outside of, stator 102, coupling into each of the multiple keybars 118. The coupling of magnetic flux into a keybar 118 induces keybar voltages and keybar currents in the keybar, which current flows from the keybar to a flange 204 coupled to the keybar. A mechanical joint by which a keybar 118 is coupled to a flange 204 can be a poor electrical conductor that provides a high resistance path for the current. As a result, the joint can be a source of undesirable energy dissipation and heat generation in power generator 100, and is also a potential source of arcing and pitting in the power generator. Furthermore, the flow of keybar current in a magnetically and electrically resistive flange 204 results in undesirable energy and heat dissipation in the flange. To avoid overheating the joint and the flange 204 and potential arcing and pitting, a power generator such as power generator 100 sometimes must be operated at backed off levels of magnetic flux and output voltage, reducing the efficiency and rated power level of the power generator 100.

In addition, the induction of keybar voltage in each of the multiple keybars 118 can result in a voltage differential between keybar voltages induced in two of the multiple keybars 118. When adjacent keybars 118 are coupled to adjacent lamination segments 304, a keybar voltage differential appearing between the adjacent keybars 118 may also appear across the adjacent lamination segments 304. The voltage differential between adjacent lamination segments 304 can cause arcing between the two segments, overheating in the stator core 104, and reduced generator performance. The arcing can also create localized heating in the core, causing lamination segments 304, and lamination rings 302, to fuse together. Such fusing can spread quickly in generator 100 as the lamination segments 304, and lamination rings 302, short circuit to each other, resulting in damage to the generator.

Therefore, a need exists for a method and apparatus for further reducing the heat dissipated in the stator and for reducing keybar voltage differentials that may appear between keybars.

BRIEF SUMMARY OF THE INVENTION

Thus there is a particular need for a method and apparatus that reduces the heat dissipated in a generator stator and that reduces keybar voltage differentials that may appear between keybars. Briefly, in accordance with an embodiment of the present invention, a thermal control and keybar voltage reduction mechanism is provided for use in a power generator having multiple keybars. The thermal control and keybar voltage reduction mechanism includes a keybar coupler capable of being electrically coupled to each of a first keybar of the multiple keybars and a second keybar of the multiple keybars. When the rotor rotates in the stator, the keybar coupler provides a low resistance electrical path from the first keybar to the second keybar for a current induced in the first keybar the rotation of the rotor. By providing a low resistance path, the thermal control and keybar voltage reduction mechanism shunts the current away from a high resistance path and reduces the heat dissipated by the power generator. In addition, by shunting the current away from a high resistance path, a voltage differential that can appear in the high resistance path is reduced, which reduces the likelihood of arcing and pitting in a power generator. Furthermore, by providing a low resistance path between two coupled keybars, the voltage differential reduction mechanism produces a larger current than would be produced in a single uncoupled keybar. The current in turn produces a first magnetic field that opposes a second magnetic field induced in the stator by the rotation of the rotor. By opposing the second magnetic field, the first magnetic field reduces the effective magnetic field induced by the rotation of the rotor, thereby reducing voltage differentials that can be induced by the effective magnetic field.

BRIEF DESCRIPTION OF THE DRAWINGS

FIG. 1 is an isometric perspective of an end view of a cross-section of a power generator of the prior art.

DETAILED DESCRIPTION OF THE INVENTION

Figure 4:
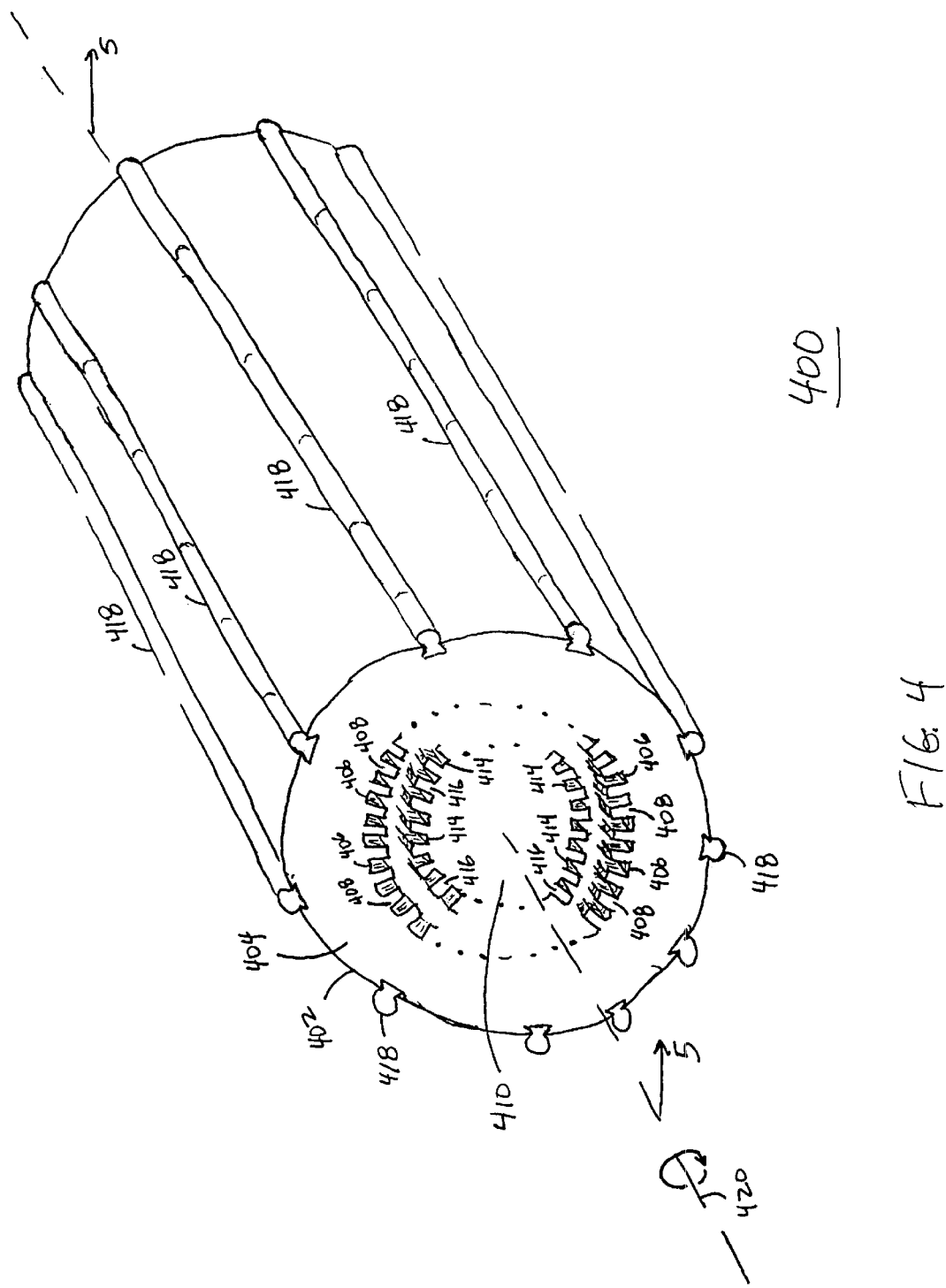
FIG. 4 is an end view of a cross-section of an exemplary power generator from an isometric perspective in accordance with an embodiment of the present invention.
Figure 5:
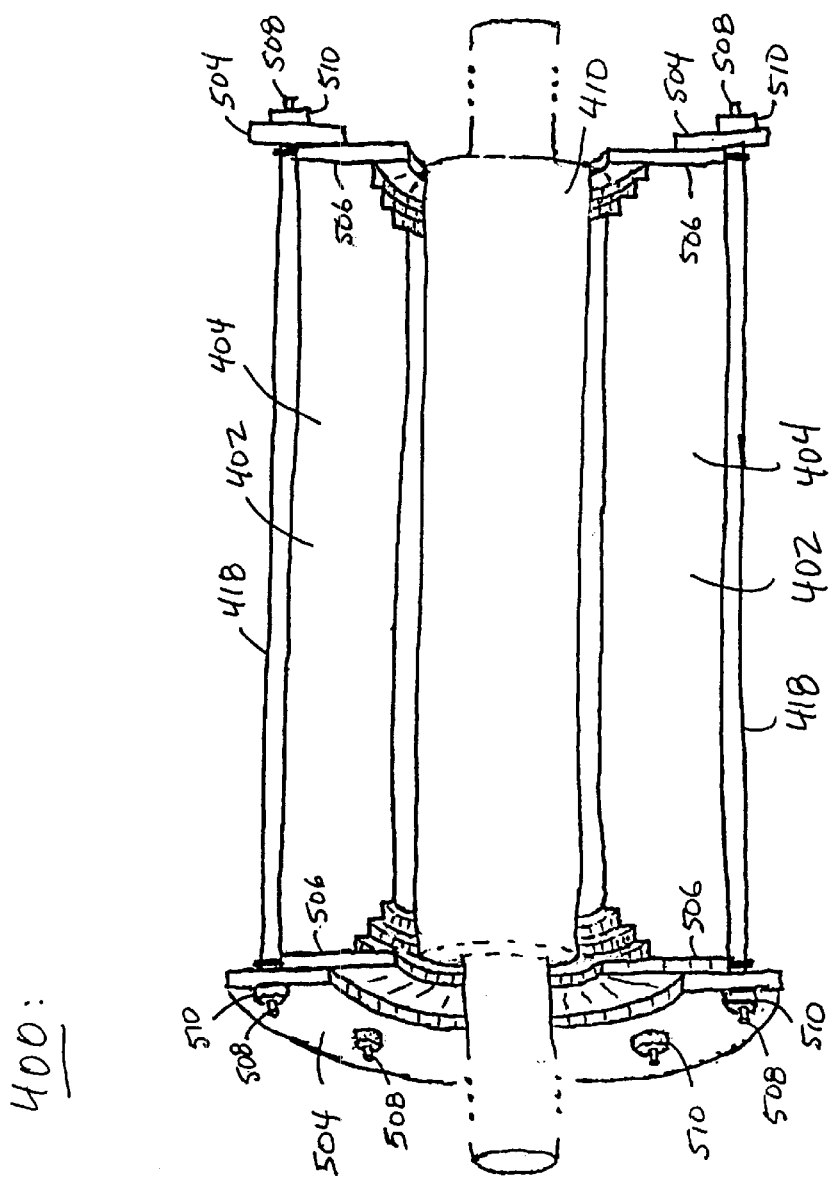
FIG. 5 is a cut-away side view of the power generator of FIG. 4 along axis 5-5 in accordance with an embodiment of the present invention.

Referring now to FIGS. 4 and 5, an exemplary power generator 400 with reduced stator heating and reduced keybar voltage differentials is illustrated. FIG. 4 is an end view of a cross-section of power generator 400 from an isometric perspective in accordance with an embodiment the present invention. FIG. 5 is a cut-away view of power generator 400 along axis 5-5 as shown in FIG. 4. As shown in FIGS. 4 and 5, electrical generator 400 includes a substantially cylindrical stator 402 having a stator core 404 and housing a substantially cylindrical rotor 410. Multiple circumferentially distributed and axially oriented keybars 418 are coupled together at each of a proximal end and a distal end by one of multiple flanges 504 (not shown in FIG. 4). Each keybar 418 is coupled to an outer surface of stator 102. The multiple keybars 118, together with the multiple flanges 504, form a keybar cage around the stator 402.

Similar to stator 102 of the prior art, an inner surface of stator 402 includes multiple stator slots 406 that are circumferentially distributed around the inner surface of the stator. Each stator slot 406 is axially oriented and extends approximately a full length of stator 402. Each stator slot 406 receives an electrically conductive stator winding (not shown). Between each pair of adjacent stator slots 406 is a stator tooth 408 that similarly is circumferentially distributed around the inner surface of stator 402 and extends approximately a full length of stator 402. Each stator tooth 408 is radially oriented and extends radially inward toward rotor 410 from stator 402.

Rotor 410 is rotatably disposed inside of stator 402. Similar to rotor 110 of the prior art, rotor 410 includes an outer surface that includes multiple rotor slots 414 that are circumferentially distributed around the outer surface of rotor 410. Each rotor slot 414 is radially oriented and extends approximately a full length of rotor 410. Between each pair of adjacent rotor slots 414 is a rotor tooth 416 that similarly is circumferentially distributed around the outer surface of rotor 410 and extends approximately a full length of rotor 410. Each rotor tooth 416 is radially oriented and extends radially outward toward stator 402 from rotor 410. An air gap exists between stator 402 and rotor 410 that allows for a peripheral rotation of rotor 410 about axis 420.

Similar to generator 100 of the prior art, each slot of the multiple rotor slots 414 receives an electrically conductive rotor winding (not shown) and each slot of the multiple stator slots 406 of generator 400 receives an electrically conductive stator winding (not shown). Each rotor winding typically extends from a proximal end of rotor 410 to a distal end of the rotor in a first rotor slot of the multiple rotor slots 414, and then returns from the distal end to the proximal end in a second rotor slot of the multiple rotor slots 414, thereby forming a loop around a portion of the rotor. Each stator winding typically extends from a proximal end of stator 402 to a distal end of the stator in a first stator slot of the multiple stator slots 406, and then returns from the distal end of the stator to the proximal end of the stator in a second stator slot of the multiple stator slots 406, thereby forming a loop inside of the stator.

The multiple flanges 504 are each disposed adjacent to an end of stator core 404. Disposed between each flange 504 and stator core 404 is an outside space block 506. Each of the multiple flanges 504 is a ring-shaped metallic material that includes multiple keybar stud apertures (not shown) for receiving a keybar stud 508. The apertures are circumferentially disposed around each flange 504 in positions that correspond to positions of keybars 418 around stator 402. Each end of each keybar 418 includes a threaded keybar stud 508 that extends axially outward from the end of the keybar. Each flange 504 is placed on an end of stator 402 and over the keybar studs 508 such that each stud extends through the flange via a corresponding keybar stud aperture. Each flange 504 is then mechanically fastened onto an end of stator 402 and the multiple keybars 418 by multiple threaded nuts 510 that are each screwed onto a correspondingly threaded keybar stud 508. The mechanical joint between each flange 504 and each of the multiple keybars 418 provides a poor electrical contact and a potentially high resistance path for any current passing through.

Stator core 404 preferably includes multiple, stacked ring-shaped laminations, similar to stator core 104 of the prior art. Preferably, each ring-shaped lamination includes multiple lamination segments, which segments each include multiple dovetail-shaped slots in an outer edge of the segment for mechanically coupling the segment to one or more keybars 418. In turn, each keybar 418 includes an outer side and an inner, locking side. The locking side includes a dovetail-shaped ridge that extends a length of the keybar and that is designed to mate with a dovetail-shaped slot of a lamination, thereby coupling the ring-shaped laminations to the keybars. Multiple flanges 504 then hold the multiple keybars 418 and, in association with the keybars, the multiple lamination segments and associated ring-shaped laminations in position in stator core 404.

Figure 6:
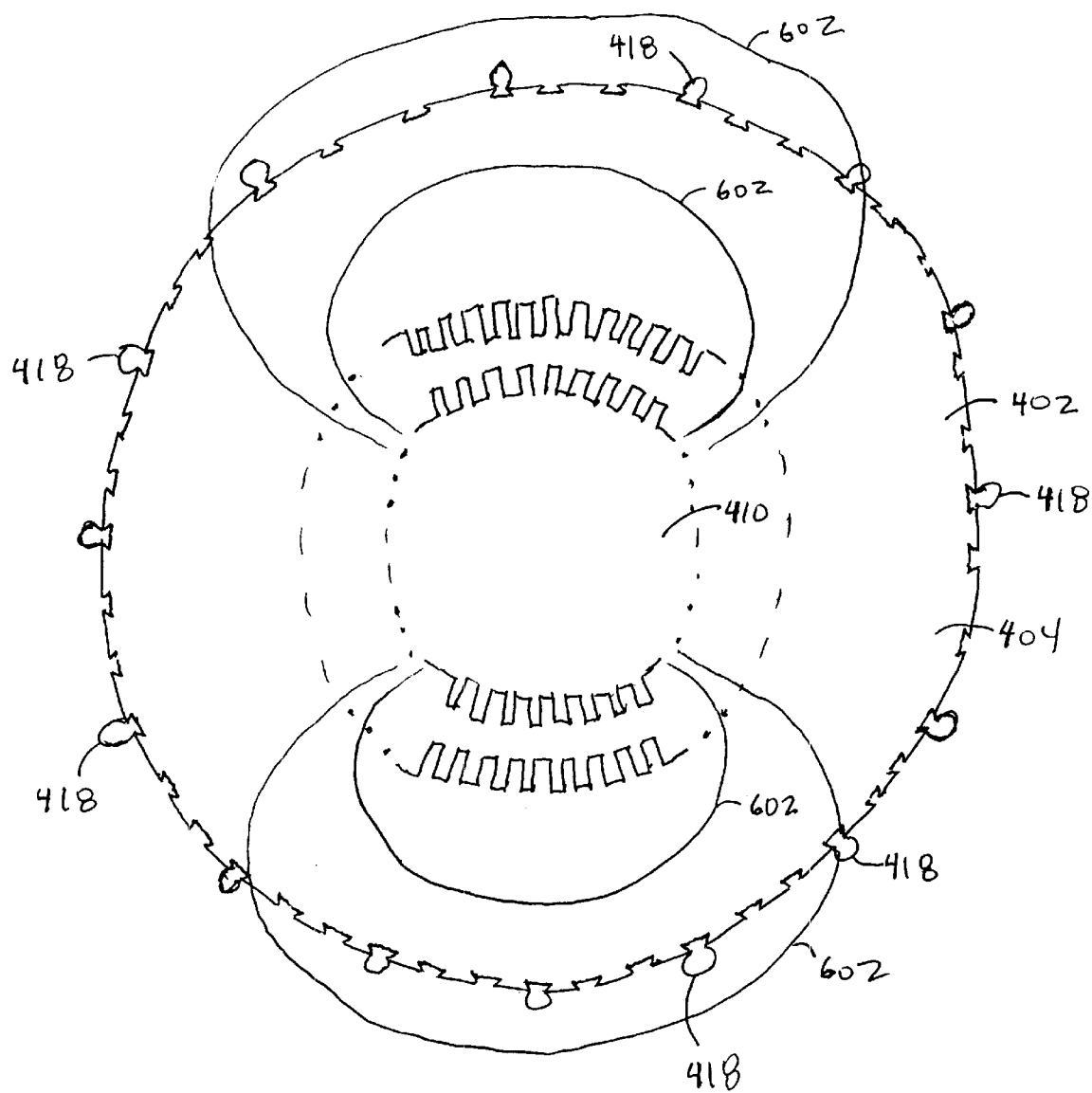
FIG. 6 is an end view of a cross-section of the power generator of FIG. 4 in accordance with an embodiment of the present invention.

FIG. 6 is an end view of a cross-section of generator 400. As shown in FIG. 6, a rotation of rotor 410 inside of stator 402 when a DC current is flowing in the multiple windings of rotor 410 induces magnetic fields in, and a passage of magnetic flux 602 through, stator 402. The magnetic flux 602 induces eddy currents and magnetic and resistive losses in stator 402, causing a dissipation of energy and a concomitant temperature increase in the stator. The magnetic flux passing through and spilling outside of stator 402 couples into each of the multiple keybars 418, inducing keybar voltages and keybar currents in each keybar. A flow of keybar current through the joint by which a keybar 418 is coupled to a flange 504 may result in resistive losses and undesirable heat dissipation. Furthermore, a flow of keybar current in a magnetically and electrically resistive flange 504 may result in undesirable energy and heat dissipation in the flange. Therefore, power generator 400 includes a thermal control and keybar voltage differential reduction mechanism that shunts the keybar current away from the joint and flange, reducing the need to operate power generator 400 at backed off levels of magnetic flux and output voltage.

Figure 7:
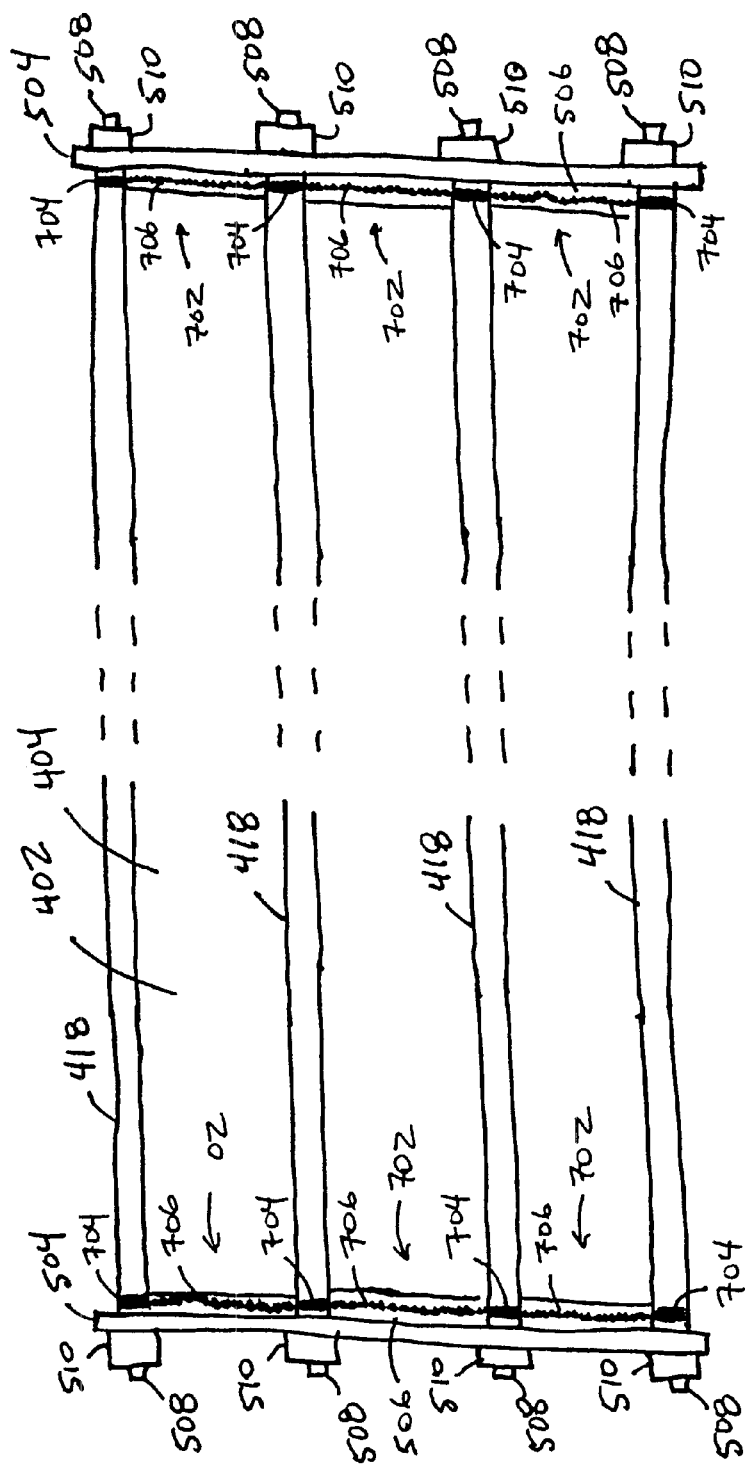
FIG. 7 is a side view of the power generator of FIG. 4 in accordance with an embodiment of the present invention.
Figure 8:
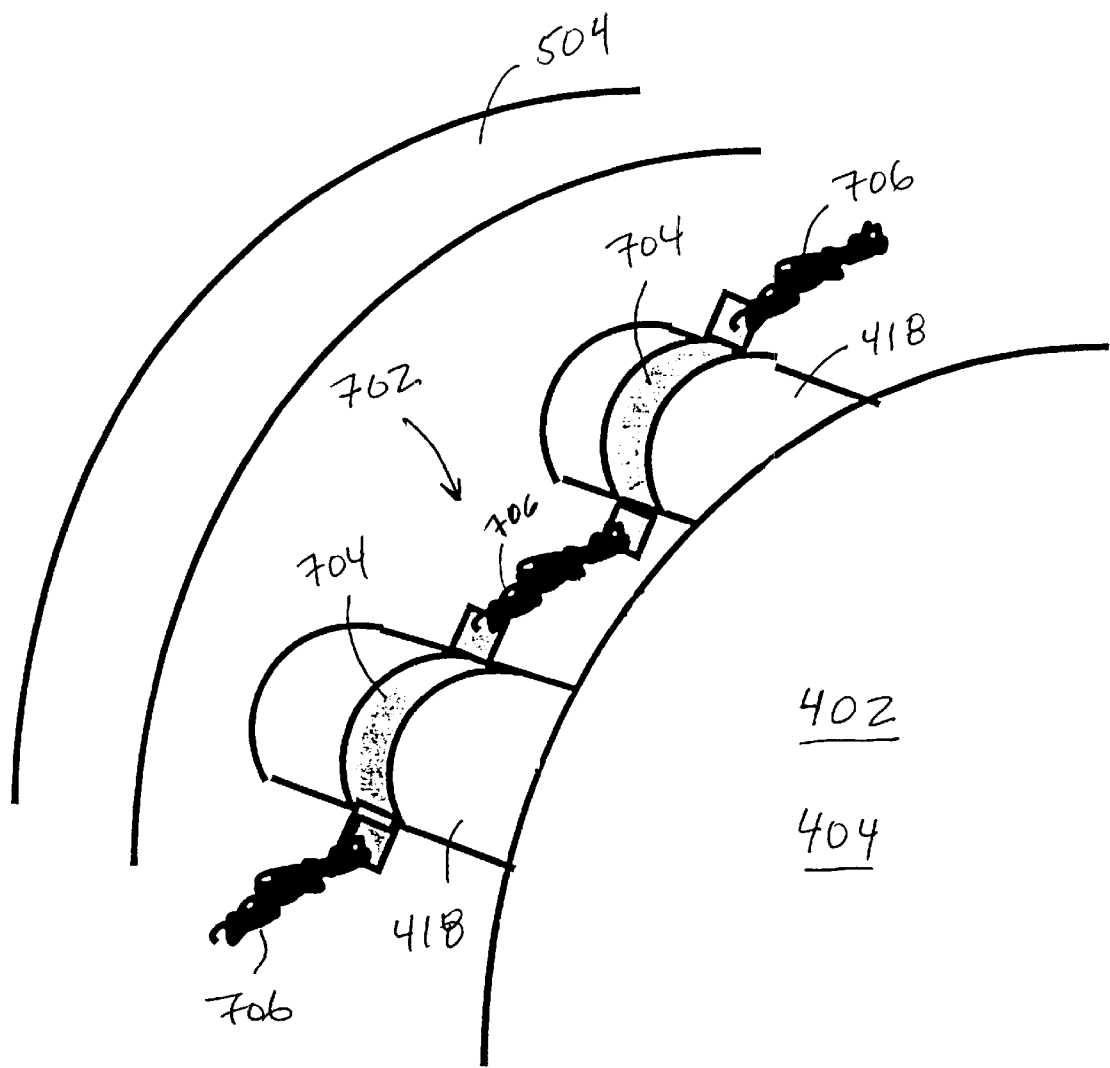
FIG. 8 is a magnified perspective view of an end of the power generator of FIG. 7 in accordance with an embodiment of the present invention.
Figure 9:
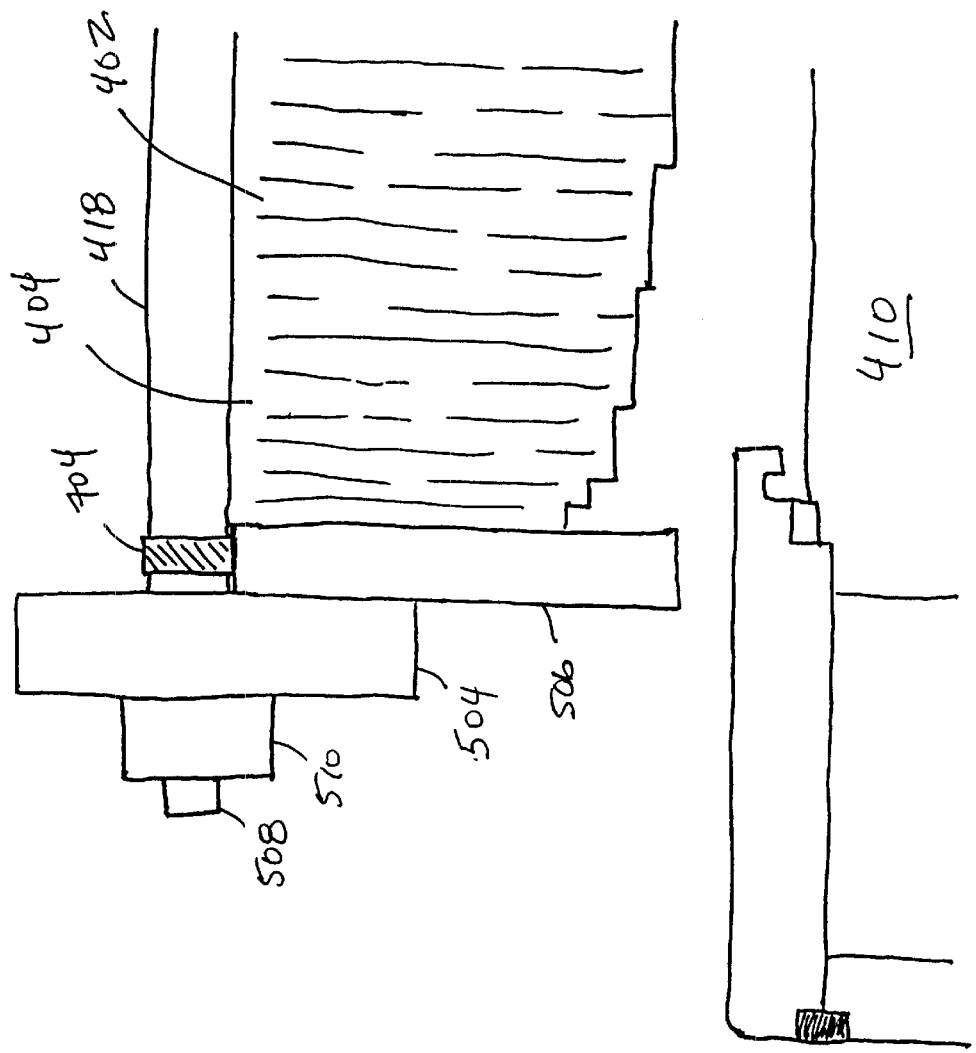
FIG. 9 is a partial cross-section of an end of the power generator of FIG. 7 in accordance with an embodiment of the present invention.

Referring to FIGS. 7, 8, and 9, an exemplary thermal control and keybar voltage differential reduction mechanism is illustrated in accordance with an embodiment of the present invention. FIG. 7 is a side view of power generator 400 in accordance with an embodiment of the present invention. FIG. 8 is a magnified perspective view of an end of the power generator of FIG. 7 in accordance with an embodiment of the present invention. FIG. 9 is a partial cross-section of an end of the power generator of FIG. 7 in accordance with an embodiment of the present invention. The thermal control and keybar voltage differential reduction mechanism includes multiple keybar couplers 702 that each provides a low resistance electrical path between adjacent keybars 418. By providing a low resistance path, each keybar coupler 702 provides a low resistance shunt to the high resistance mechanical joint coupling a keybar 418 to a flange 504. The low resistance shunt detours a keybar current away from the flange 604 and the mechanical joint.

Each keybar coupler 702 includes multiple, preferably two, electrical conductors 704 that are linked to one another by a flexible, electrically conductive linking apparatus 706. Each electrical conductor of the multiple electrical conductors 704 is electrically coupled to a keybar 418 and provides a conductive path for a current in the keybar. For example, each electrical conductor 702 may be an electrically conductive, preferably copper, ring coupled to an exterior of a keybar or an electrically conductive rod disposed in a diametrical aperture in the keybar and affixed to the keybar by a brazed joint. Preferably, each electrical conductor 702 is coupled to a respective keybar 418 near an end of the keybar, such as at a position opposite the outside space block 506 in stator 402. Linking apparatus 706 is electrically coupled to each of the multiple electrical conductors 704 and provides a conductive path from one electrical conductor of the multiple electrical conductors 704 to another electrical conductor of the multiple electrical conductors 704, and thereby from one keybar 418 to another, different keybar 418. Preferably, each linking apparatus 706 includes a flexible electrical conductor, such as braided copper wires or a chain of copper links.

The operation of the thermal control and keybar voltage differential reduction mechanism is as follows. When rotor 410 rotates in stator 402, rotor 410 induces magnetic fields in, and a passage of magnetic flux through, stator 402. A portion of the magnetic flux passes completely through stator 402 and spills outside of the outer surface of stator 402, coupling into each of the multiple keybars 418. The coupling of magnetic flux into each keybar 418 induces keybar voltages and keybar currents in the keybar. Each keybar coupler 702 then provides the keybar currents induced in a keybar with a low resistance path to another, coupled keybar of the multiple keybars 418. By providing a low resistance path for the keybar currents, the keybar coupler 702 reduces a flow of keybar currents to a flange 504 via the high resistance mechanical joints. By reducing the flow of keybar currents in a flange 504 and in the high resistance mechanical joints, the heat and energy dissipated in each of the flange and the joints is reduced.

Furthermore, the keybar currents in each keybar 418 induces a first magnetic field in stator 402 that opposes a second magnetic field induced in stator 402 by the rotation of rotor 410. By opposing the second magnetic field, the keybar current induced magnetic field reduces the effective magnetic fields in stator 402 and in each keybar 418. By electrically coupling multiple keybars 418, each keybar coupler 702 facilitates a flow of a keybar current through multiple keybars, permitting a larger keybar current than would flow in an uncoupled keybar. A larger keybar current generates a larger opposing magnetic field, causing an additional reduction of the effective magnetic fields. A result is smaller eddy currents and less energy and heat dissipation in stator 402 and a reduction of the magnetic flux coupling into each of the multiple keybars 418, thereby reducing the keybar voltage differentials among the keybars.

Figure 10:
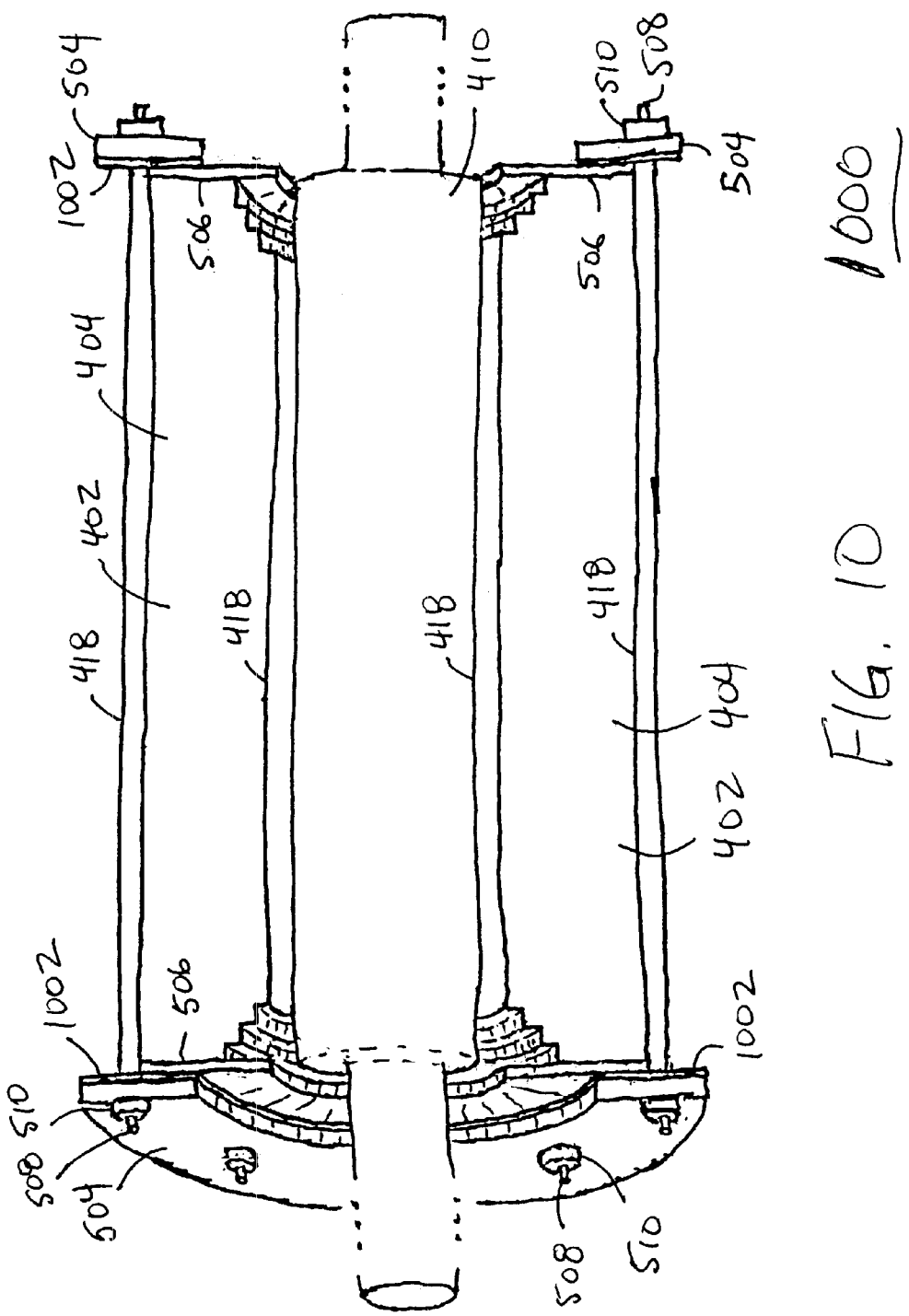
FIG. 10 is a cut away side view of a power generator in accordance with another embodiment of the present invention.
Figure 12:
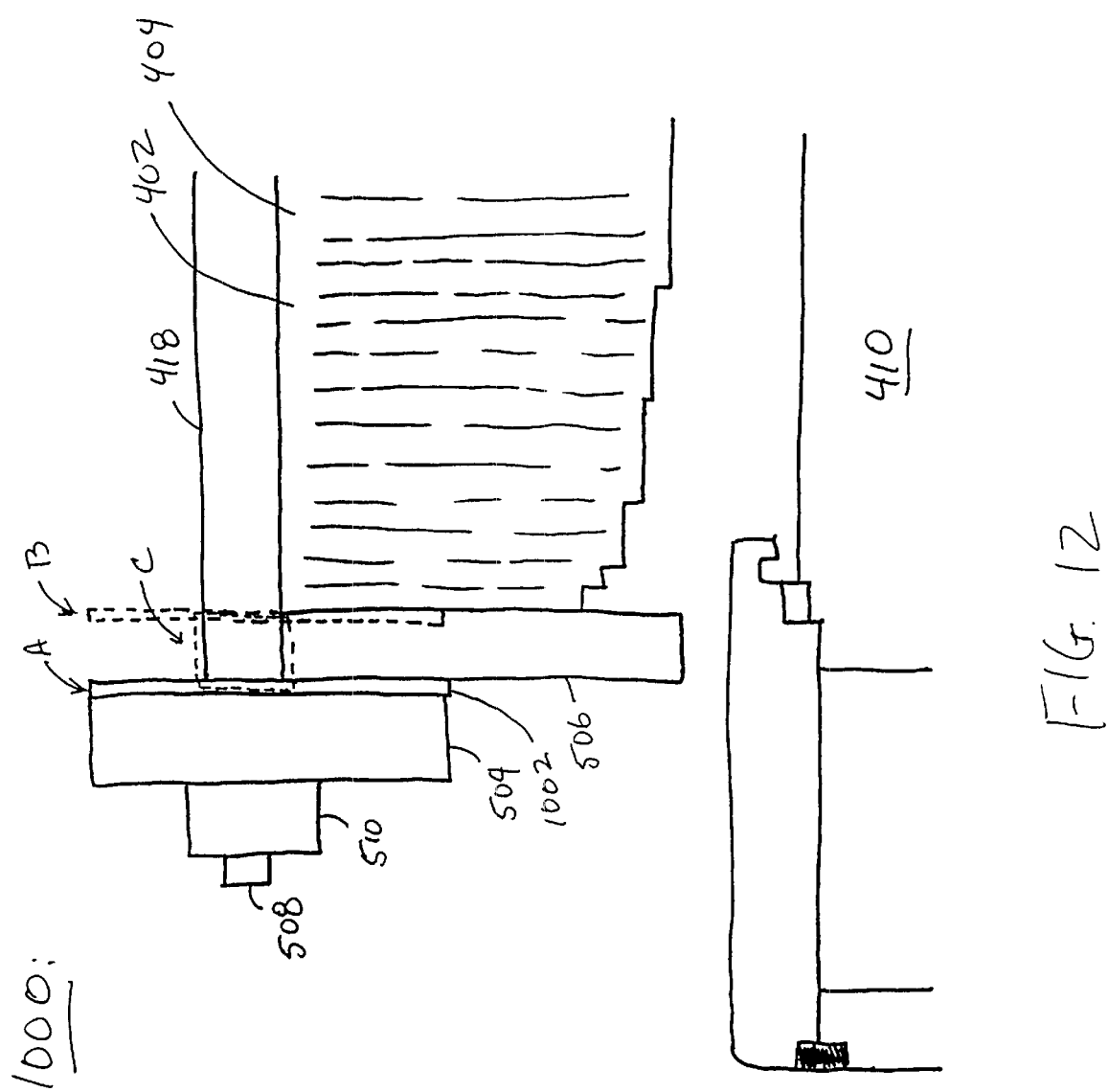
FIG. 12 is a partial cross-section of an end of the power generator of FIG. 10 in accordance with another embodiment of the present invention.
Figure 11:
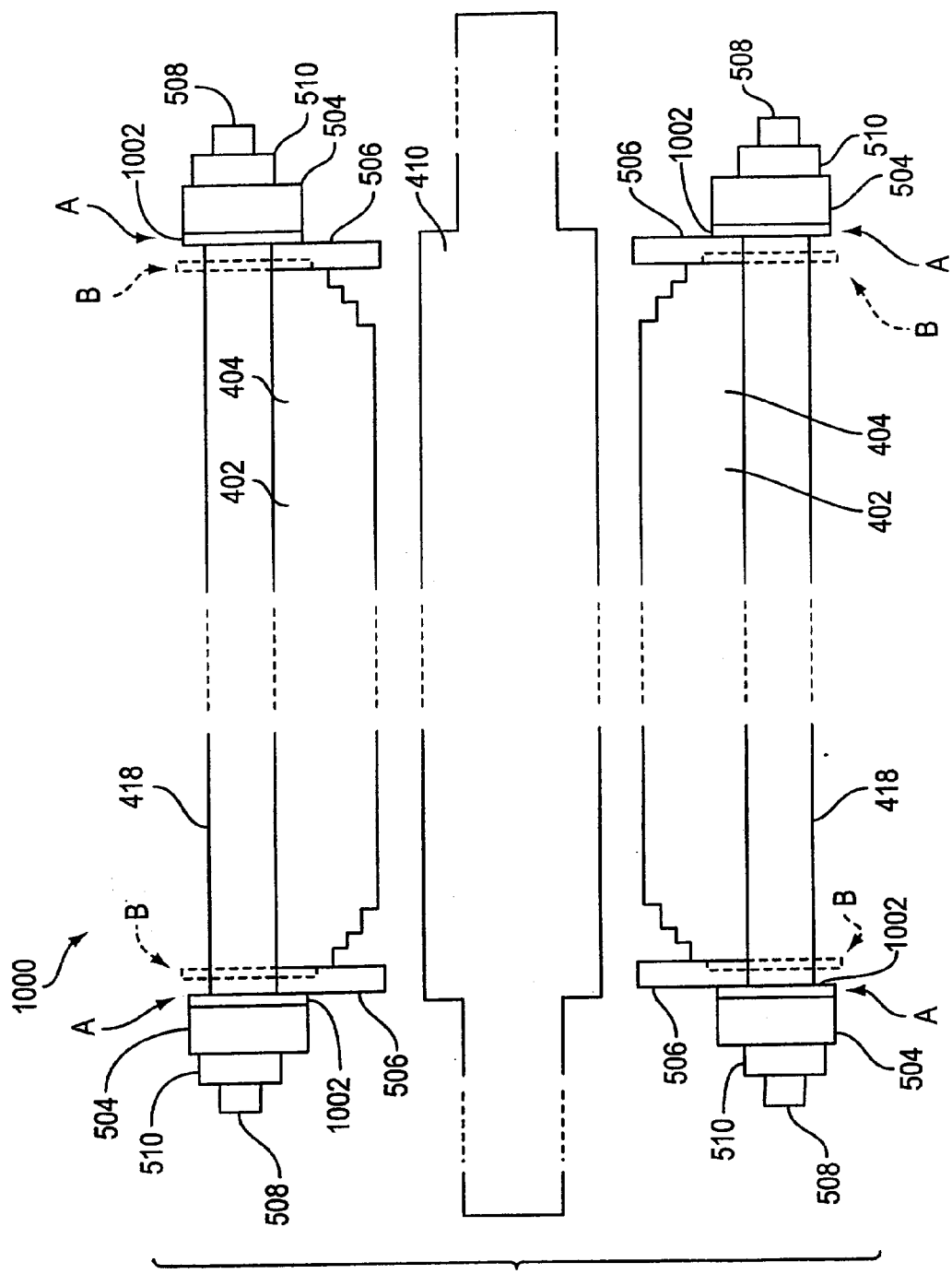
FIG. 11 is a side view of a cross section of the power generator of FIG. 10 in accordance with another embodiment of the present invention.
Figure 12:
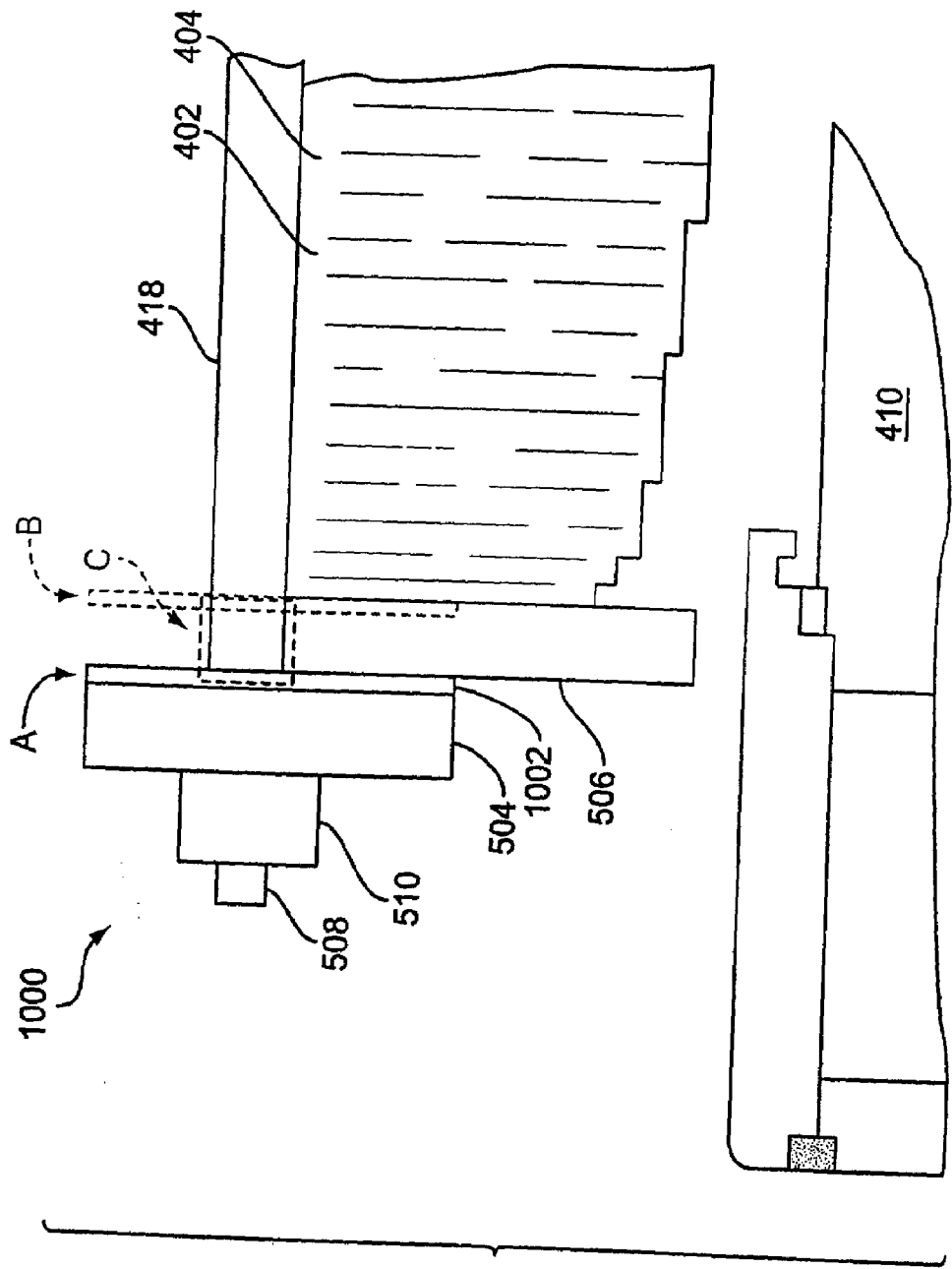
Figure 13:
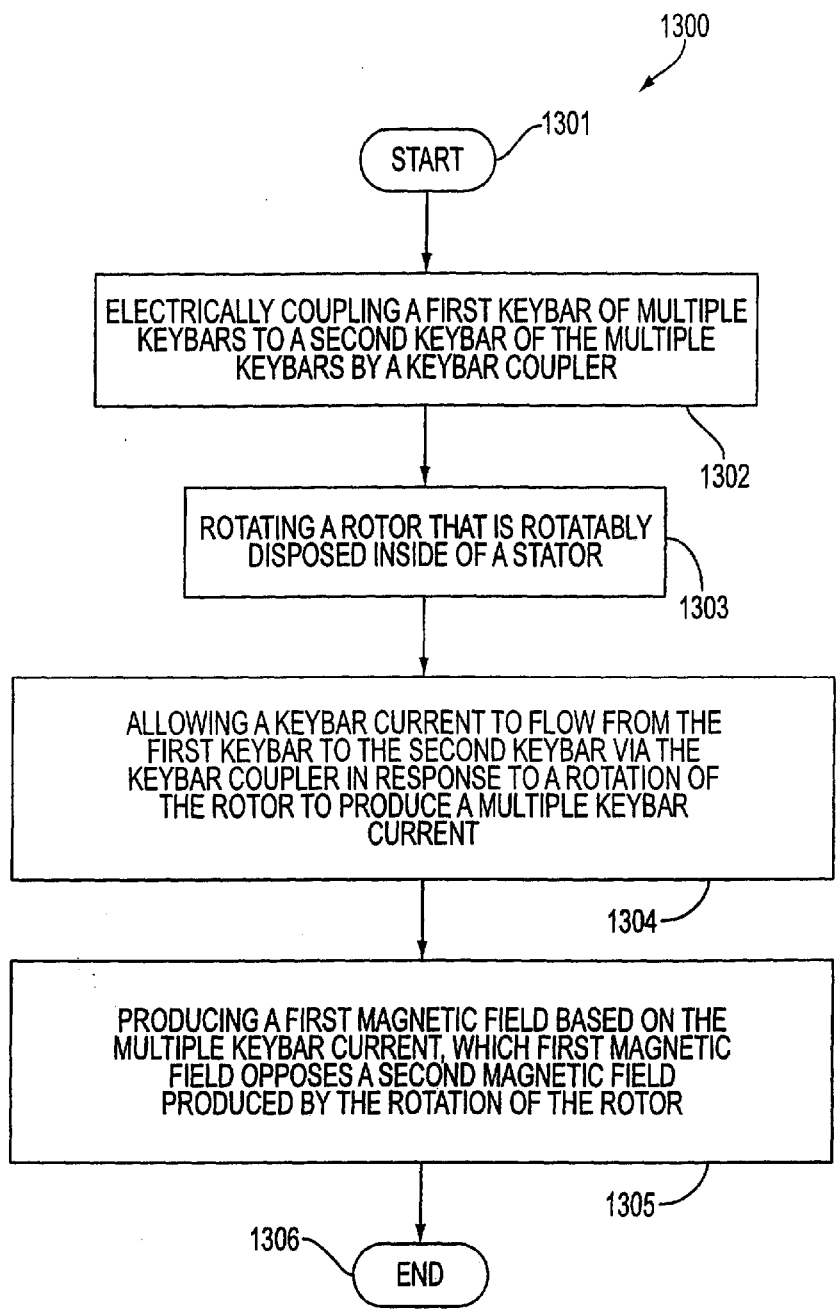
Figure 14:
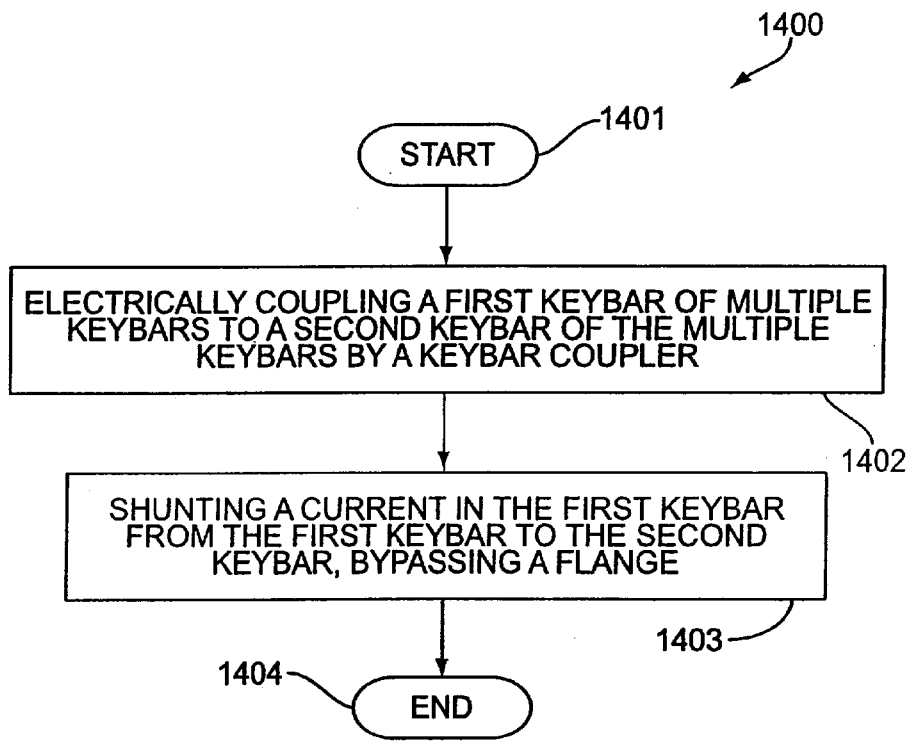

Referring to FIGS. 10, 11, and 12, an exemplary thermal control and keybar voltage differential reduction mechanism is illustrated in accordance with another embodiment of the present invention. FIG. 10 is a cut away side view of a power generator 1000 in accordance with another embodiment of the present invention. FIG. 11 is a side view of a cross-section of the power generator of FIG. 10 in accordance with another embodiment of the present invention. FIG. 12 is a partial cross-section of an end of the power generator of FIG. 10 in accordance with another embodiment of the present invention. A difference between power generator 1000 and power generator 400 is that power generator 1000 includes multiple keybar couplers 1002 that are each disposed between stator core 404 and a flange 504 instead of the keybar couplers 702 of power generator 400.

Preferably, each keybar coupler 1002 of FIGS. 10, 11, and 12 is an electrically conductive ring that includes a highly thermally and electrically conductive material such as copper. Each keybar coupler 1002 is disposed over an end of each of the multiple keybars 418 and includes multiple apertures (not shown). Each aperture of the multiple apertures is aligned with a keybar stud 508 of a keybar 418 and facilitates the disposition of the keybar coupler 1002 over the ends of the keybars 418. Each keybar coupler 1002 is electrically coupled to each of the multiple keybars 418, for example by brazing or by use of a mechanical fastener and acceptable electrical contacts. In one embodiment of the present invention, each keybar coupler 1002 can be disposed between an outside space block 506 and a flange 504 at an end of stator 402 (which position is denoted as position 'A' in each of FIGS. 11 and 12). In alternative embodiments of the present invention, each keybar coupler 1002 may be disposed between an end of stator core 404 and a space block 506 at an end of stator 402 (which position is denoted as position 'B' in each of FIGS. 11 and 12), or may be disposed adjacent to the space block and may be disposed between an end of each keybar 418 from which a keybar stud 508 extends and a flange 504 (which position is denoted as position 'C' in FIG. 12).

Similar to keybar coupler 702, each keybar coupler 1002 provides a low resistance electrical path between multiple keybars 418 for keybar currents and functions as a low resistance shunt to the high resistance path from a keybar 418 to a flange 504. Also, by connecting multiple keybars 418, each keybar coupler 1002 allows for a circulation of keybar currents through multiple keybars 418. In addition, a keybar coupler 1002 may provide a thermal path from stator core 404 to a flange 504 that facilitates a transfer of heat from the core to the flange and helps reduce a core operating temperature.

By providing a keybar coupler 702, 1002 that couples the multiple keybars 418 to each other and that provides a low resistance shunt to the high resistance path between a keybar 418 and a flange 504, the thermal control and keybar voltage differential reduction mechanism reduces undesirable thermal and electrical effects of a magnetic field generated by a rotation of rotor 410. Keybar coupler 702, 1002 provides a low resistance path among multiple keybars 418 for keybar currents induced by the magnetic field. The low resistance path shunts a high resistance mechanical joint coupling a keybar 418 to a flange 504 and reduces the flow of keybar current in the mechanical joint and the flange. The reduced keybar current in turn results in reduced heat dissipation in the mechanical joint and the flange. The reduced keybar current also reduces a likelihood of a significant voltage differential developing in the joint, due to the poor contact and the high resistance of the joint, that could cause arcing and pitting in the joint and the flange.

Furthermore, by providing a low resistance path among multiple keybars 418, a keybar coupler 702, 1002 facilitates a flow of a keybar current through multiple keybars, permitting a larger keybar current than would flow in an uncoupled keybar. Larger keybar currents generate larger magnetic fields in opposition to the magnetic fields induced by the rotation of rotor 410, causing an additional reduction in the effective magnetic fields. A result is smaller eddy currents and less energy and heat dissipation in stator 402 and a reduction of the magnetic flux coupling into each of the multiple keybars 418, thereby reducing the likelihood of voltage differentials among the keybars.

Figure 13:
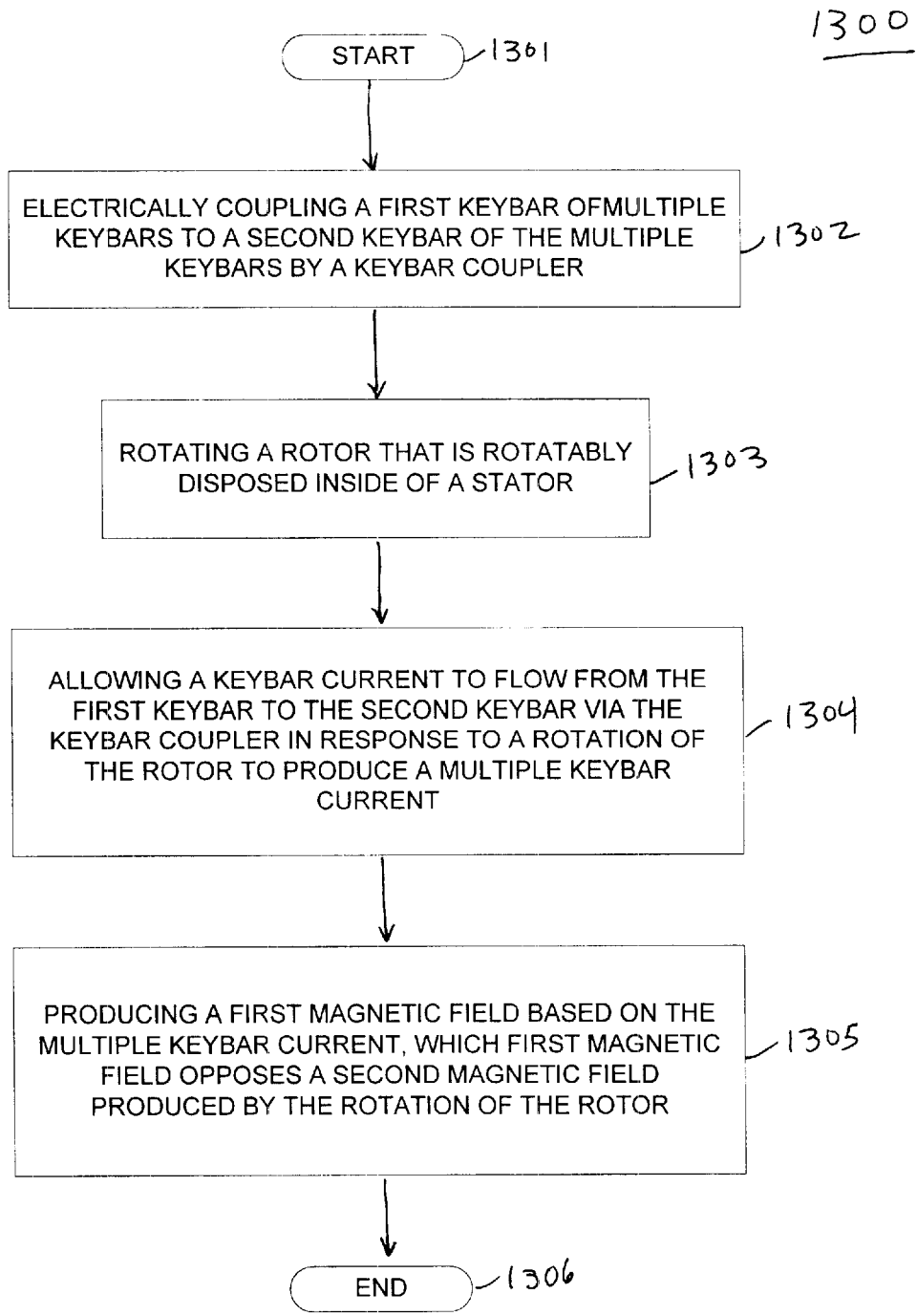
FIG. 13 is a logic flow diagram of steps executed in order to reduce an operating temperature of, and voltage differentials in, a power generator in accordance with an embodiment of the present invention.

FIG. 13 is a logic flow diagram 1300 of a method for reducing an operating temperature of, and voltage differentials in, a power generator in accordance with an embodiment of the present invention. Preferably, the power generator includes a stator having an outer surface, a rotor that is rotatably disposed inside of the stator, and multiple axially oriented keybars circumferentially disposed around the outer surface of the stator. The logic flow begins (1301) when a first keybar of the multiple keybars is electrically coupled (1302) to a second keybar of the multiple keybars by a keybar coupler. When the rotor rotates (1303), the coupling of the first and second keybars allows (1304) a current to flow from the first keybar to the second keybar via the keybar coupler in response to the rotation to produce a multiple keybar current. Based on the multiple keybar current, a first magnetic field is produced (1305). The first magnetic field produced by the multiple keybar current opposes a second magnetic field produced in the stator by the rotation of the rotor, and the logic flow ends (1306). By opposing the second magnetic field, the first magnetic field reduces the magnetic flux coupling into each of the stator and the multiple keybars. By reducing the coupling magnetic flux, the second magnetic field reduces eddy currents in, and an operating temperature of the stator and reduces keybar voltages and thereby keybar voltage differentials.

Figure 14:
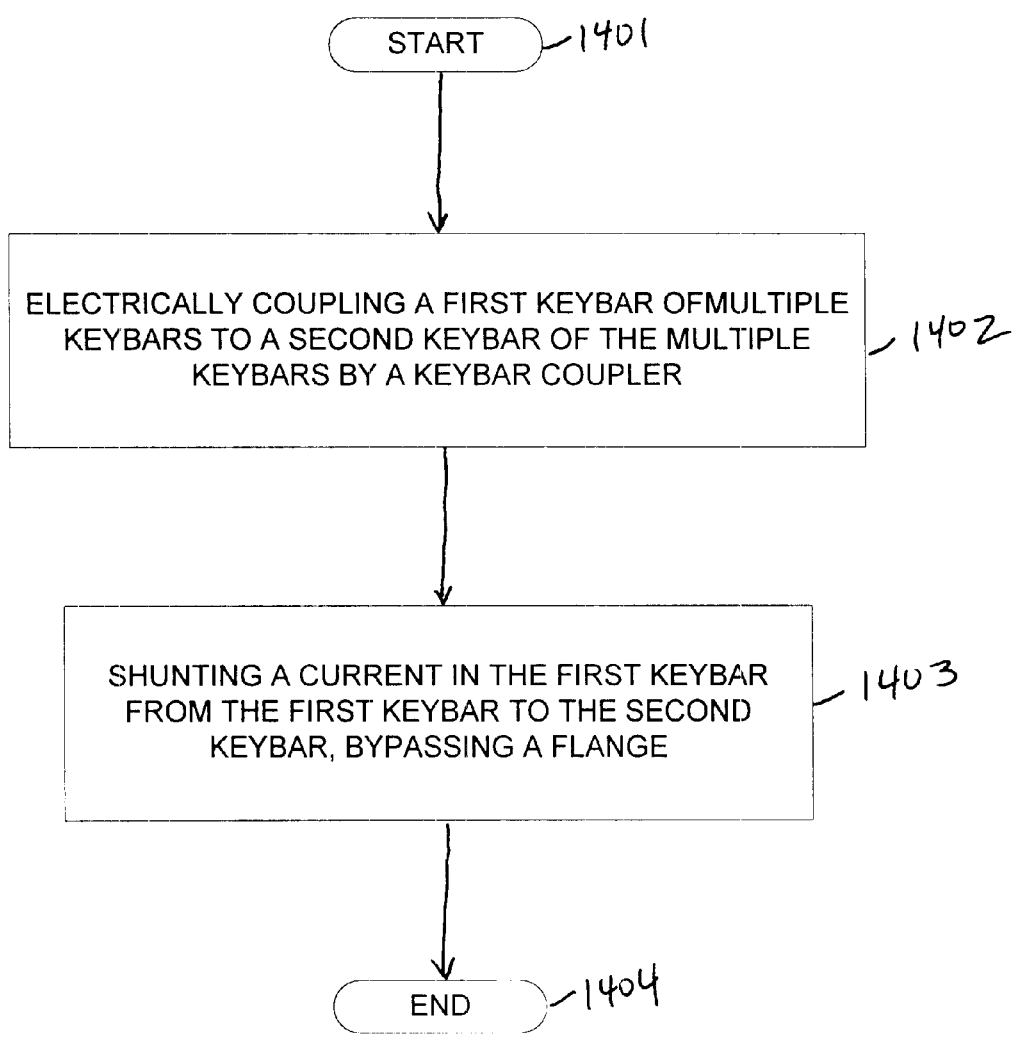
FIG. 14 is a logic flow diagram of steps executed in order to reduce an operating temperature of a power generator in accordance with another embodiment of the present invention.
Figure 2:
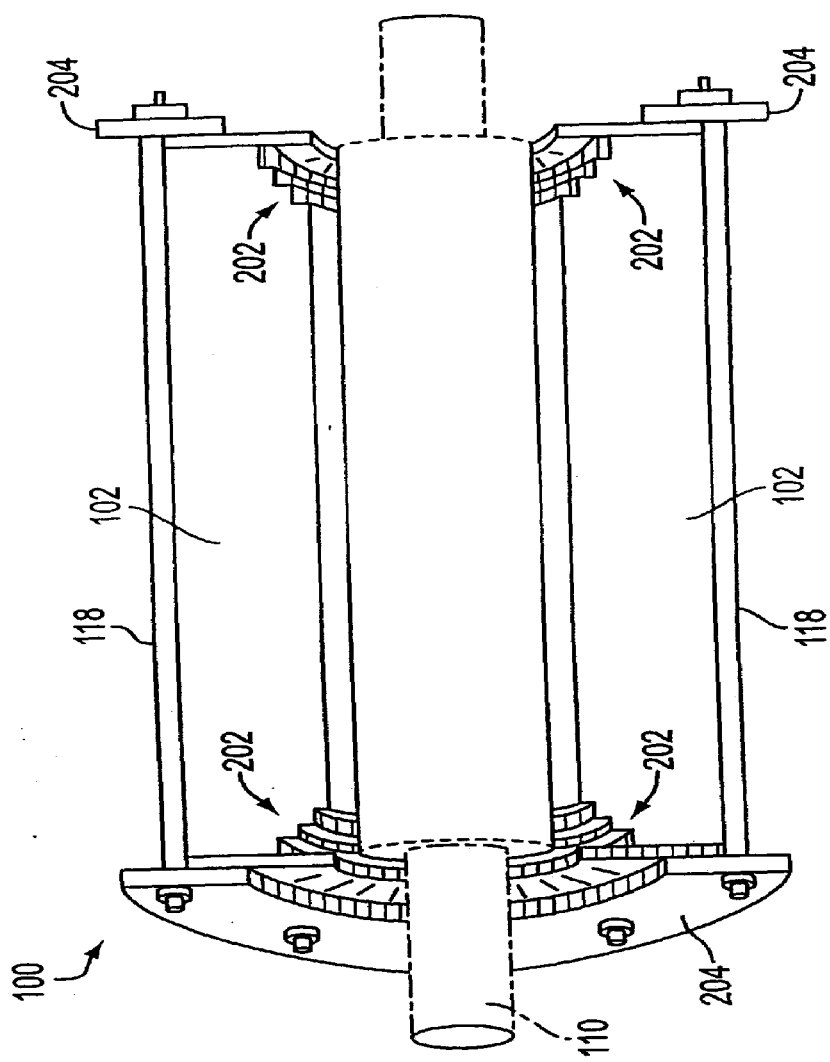
FIG. 2 is a cut-away view of the prior art power generator of FIG. 1 along axis 2-2.
Figure 3:
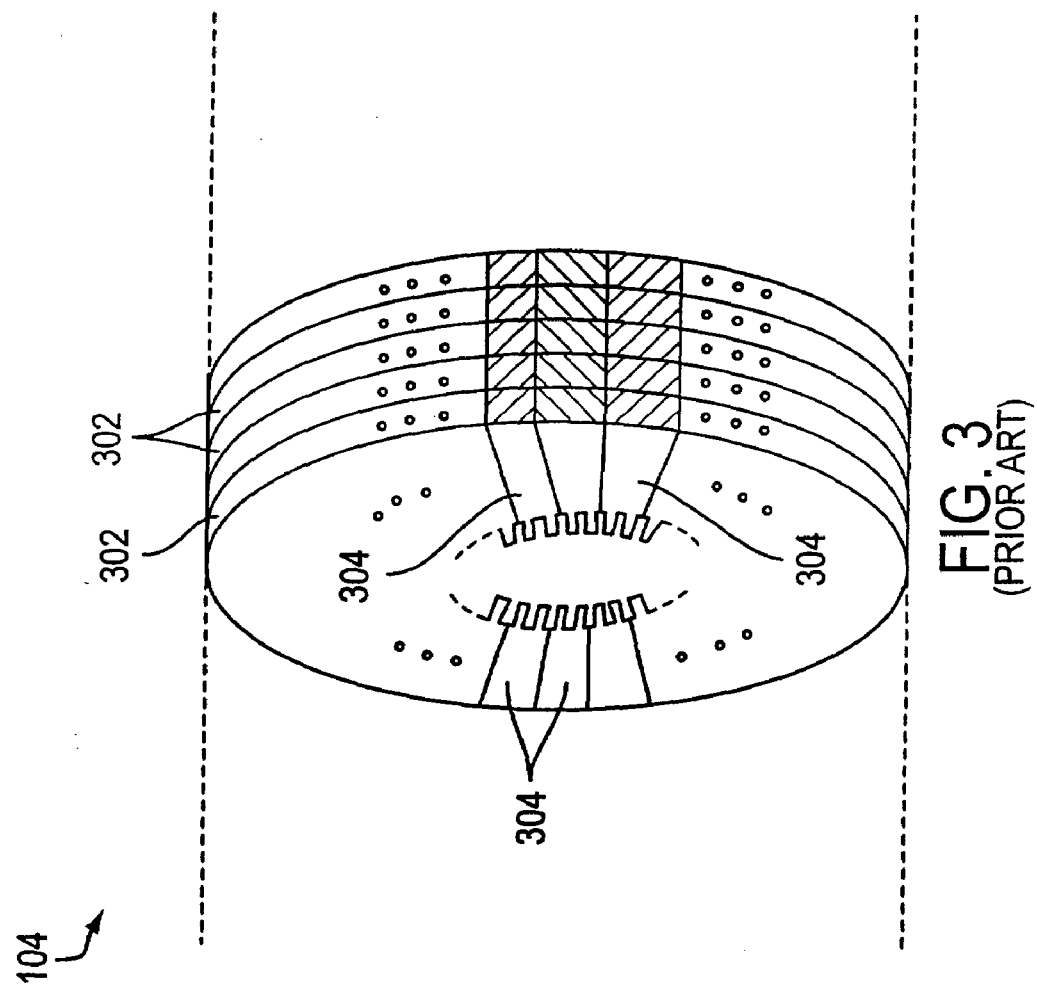
FIG. 3 is a partial perspective of the prior art power generator of FIG. 1.
Figure 5:
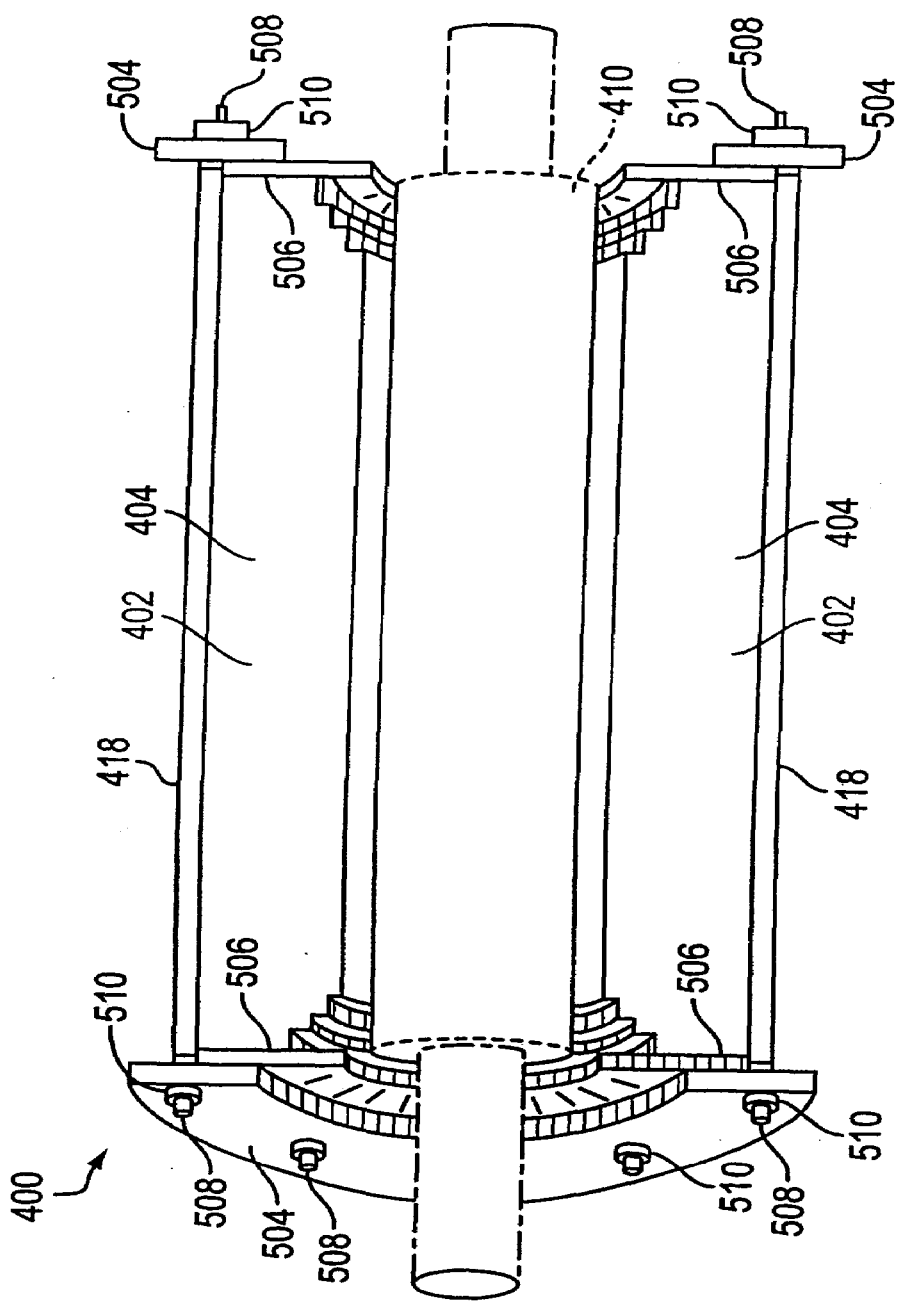
Figure 6:
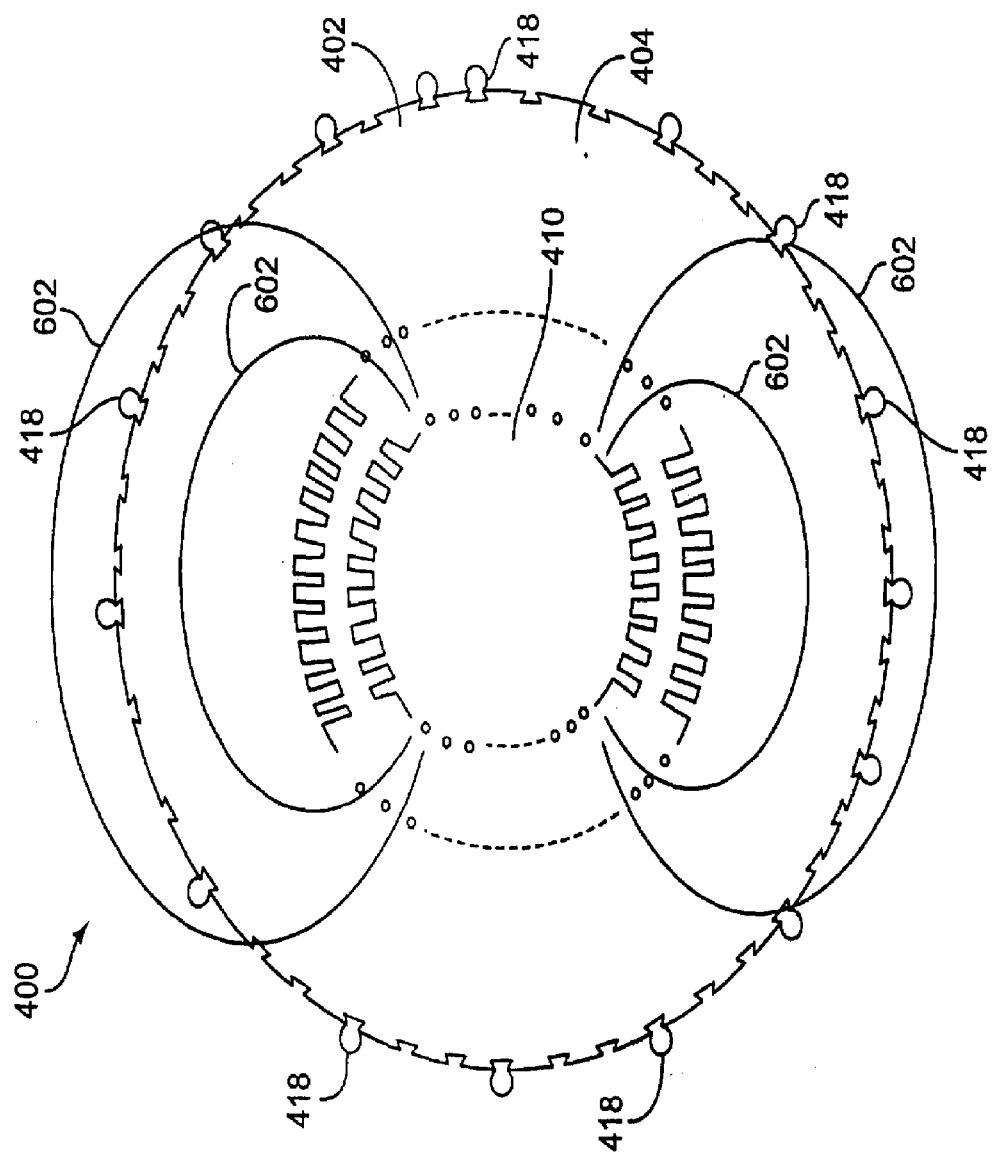
Figure 7:
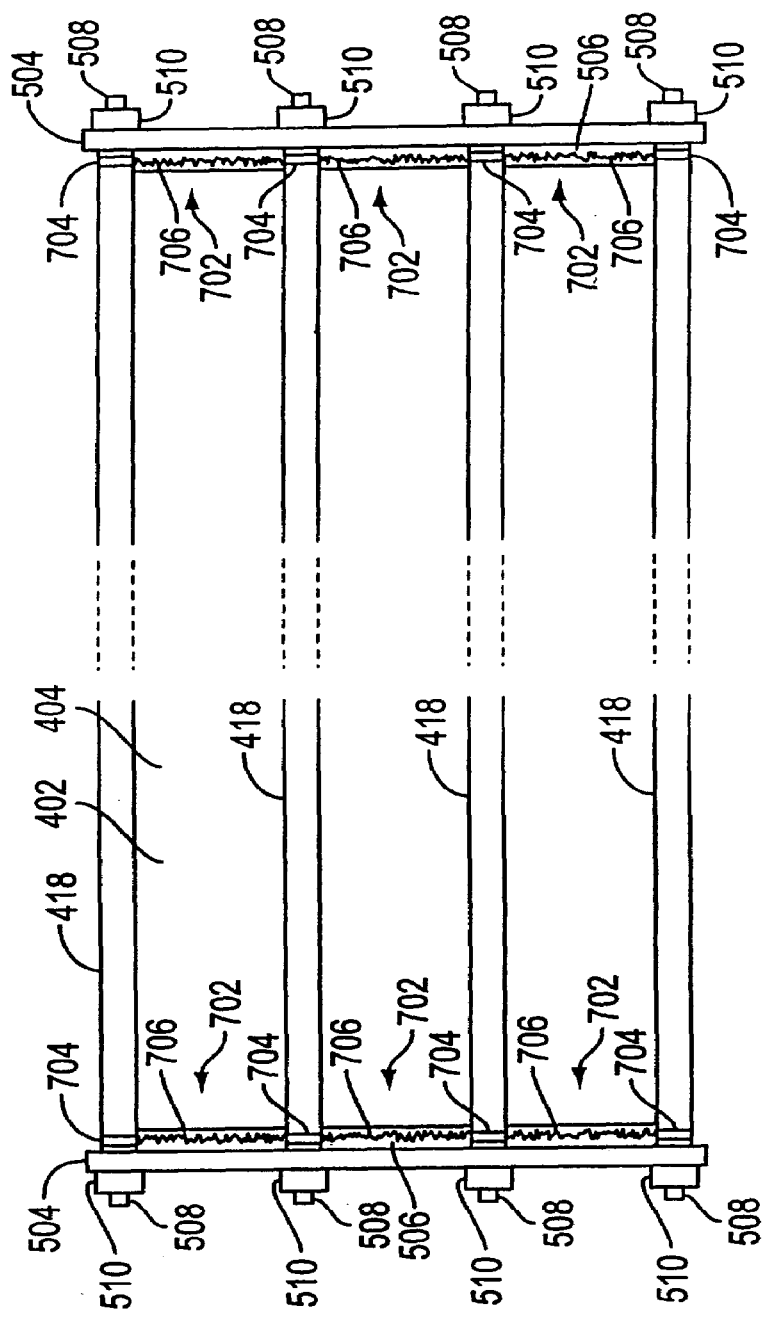
Figure 8:
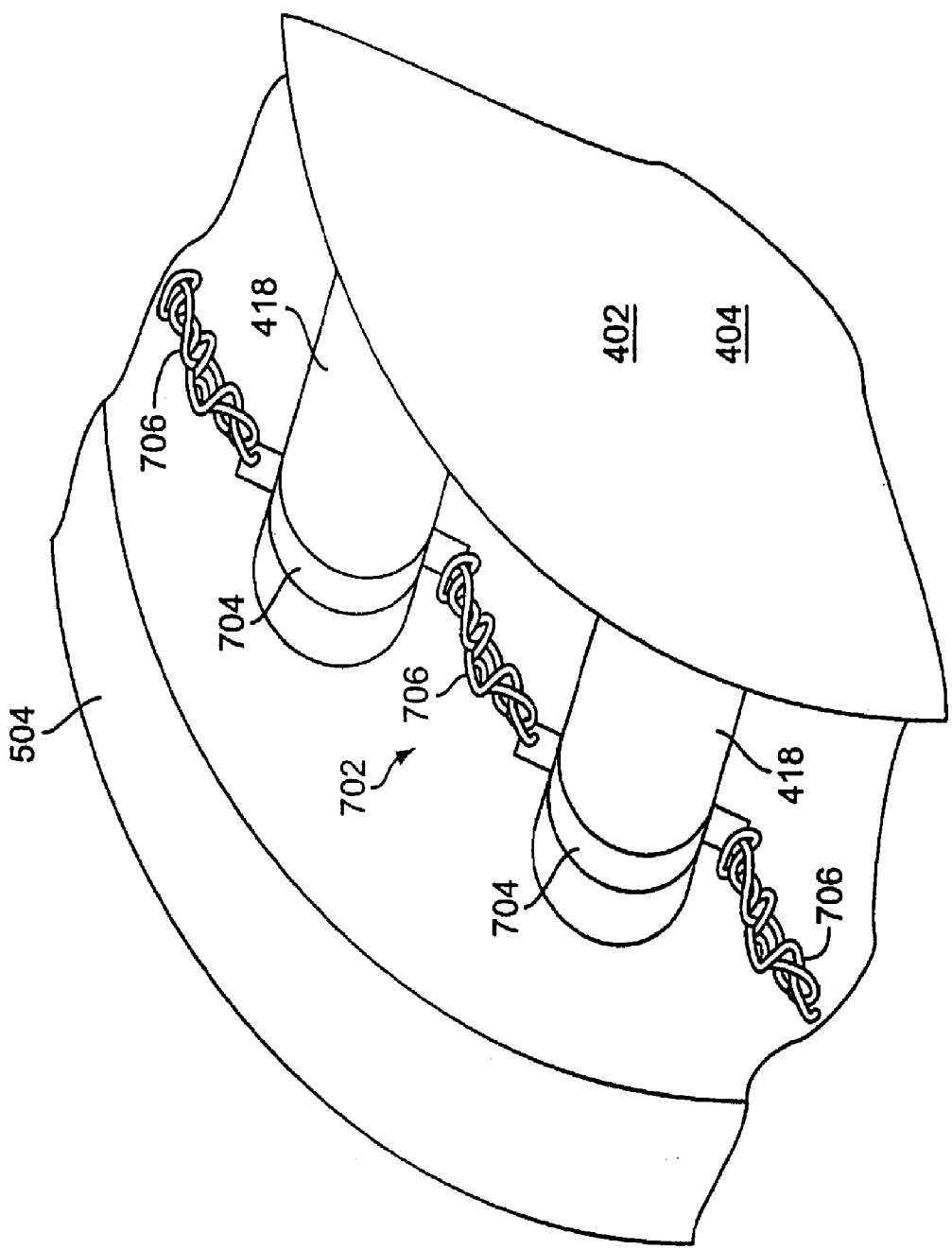
Figure 10:
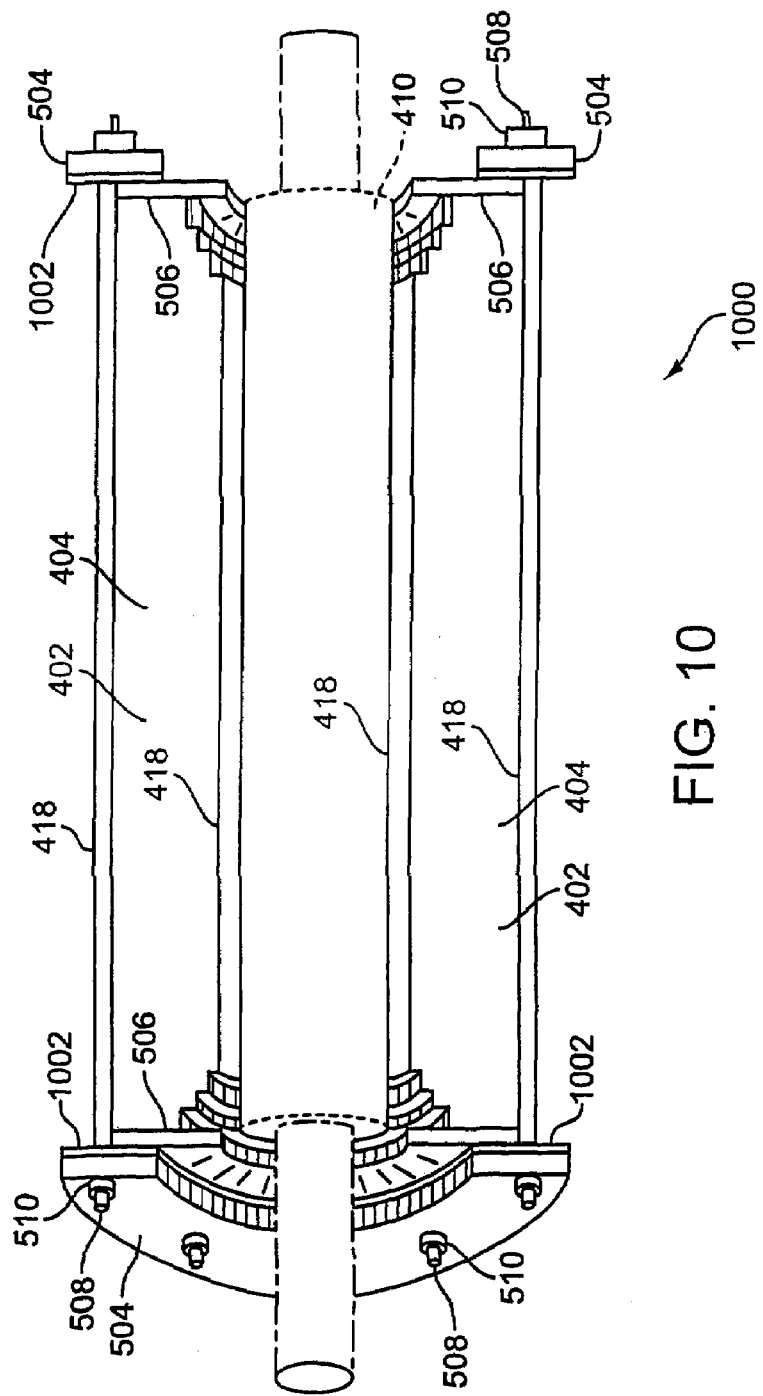

FIG. 14 is a logic flow diagram 1400 of a method for reducing an operating temperature of a power generator in accordance with another embodiment of the present invention. Preferably, the power generator includes a stator housing a rotor that is rotatably disposed in the stator. The power generator further includes multiple circumferentially distributed and axially oriented keybars that are coupled together at each of a proximal end and a distal end by one of multiple flanges. Each keybar is coupled to an outer surface of the stator and the multiple keybars, together with the multiple flanges, form a keybar cage around the stator. The logic flow begins (1401) when a first keybar of the multiple keybars is electrically coupled (1402) to a second keybar of the multiple keybars by a keybar coupler. In response to a rotation of the rotor, the coupling of the first and second keybars shunts (1403) a current in the first keybar from the first keybar to the second keybar via the keybar coupler, bypassing a flange of the multiple flanges, and the logic flow ends (1404). By bypassing the flange, heat dissipation in the flange and in a mechanical joint coupling the first keybar to the flange is reduced.

In sum, a power generator is provided that includes a keybar coupler that electrically couples multiple keybars. When a rotor rotates in a stator, the keybar coupler facilitates the induction of a multiple keybar current, which multiple keybar current is larger than a keybar current that would be induced in a single isolated keybar. The multiple keybar current produces a first magnetic field that opposes a second magnetic field induced in the stator by the rotation of the rotor. By opposing the second magnetic field, the first magnetic field reduces the amount of flux coupling into the stator and into each of the multiple keybars, thereby reducing the amount of energy and heat dissipated in the stator and the keybar voltages and voltage differentials produced in the keybars. The keybar couple also provides a low resistance shunt to the high resistance mechanical joint coupling each keybar to the flange, thereby reducing current flow in, and heat dissipation in, the joint and flange.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

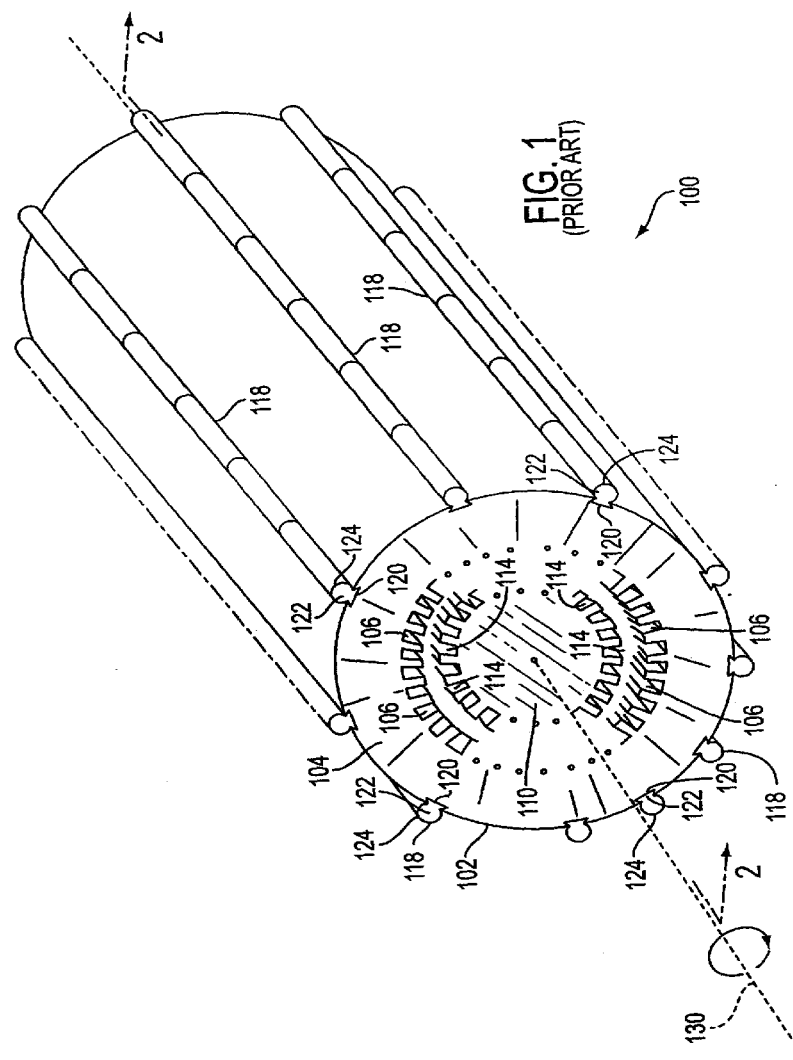

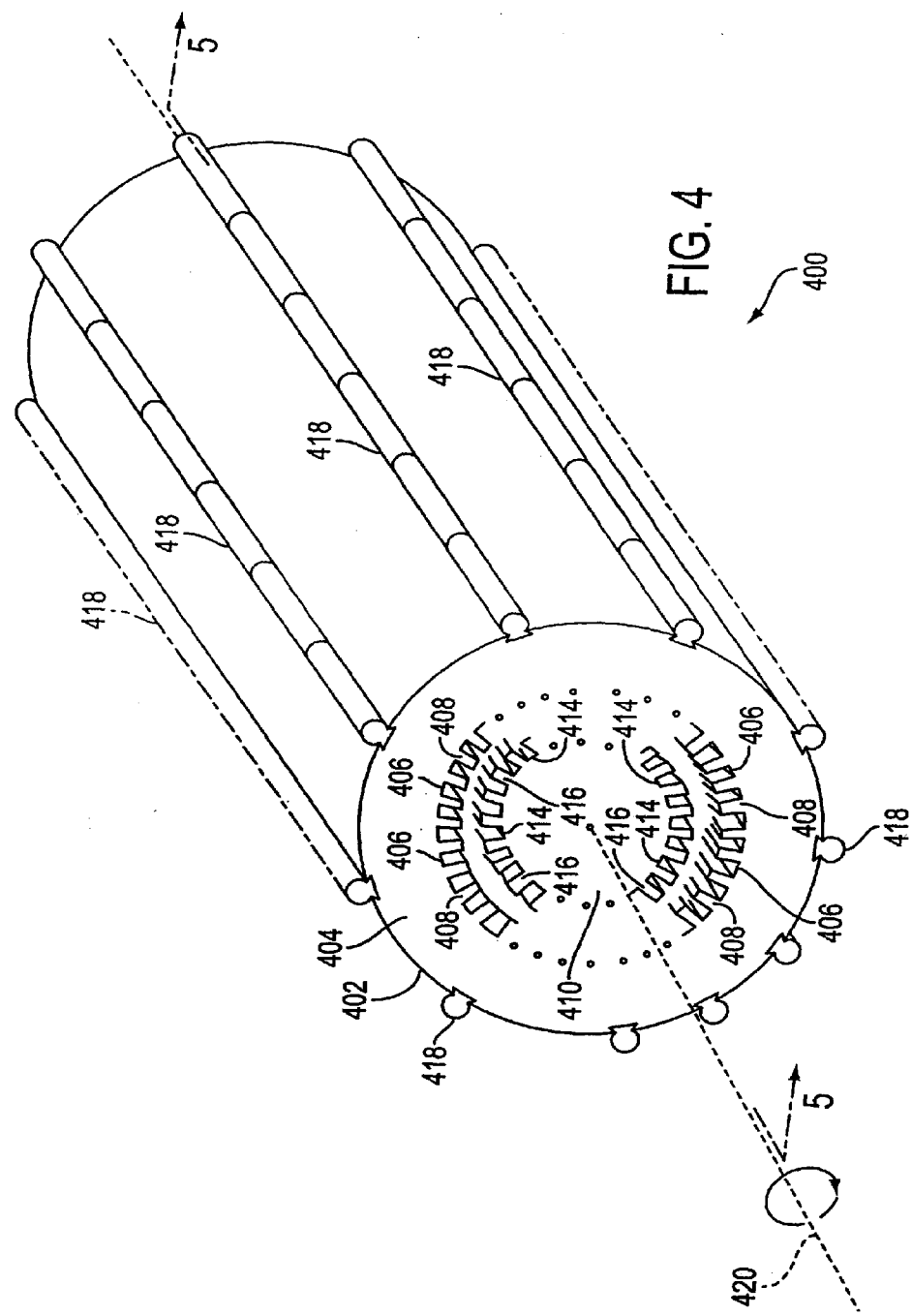

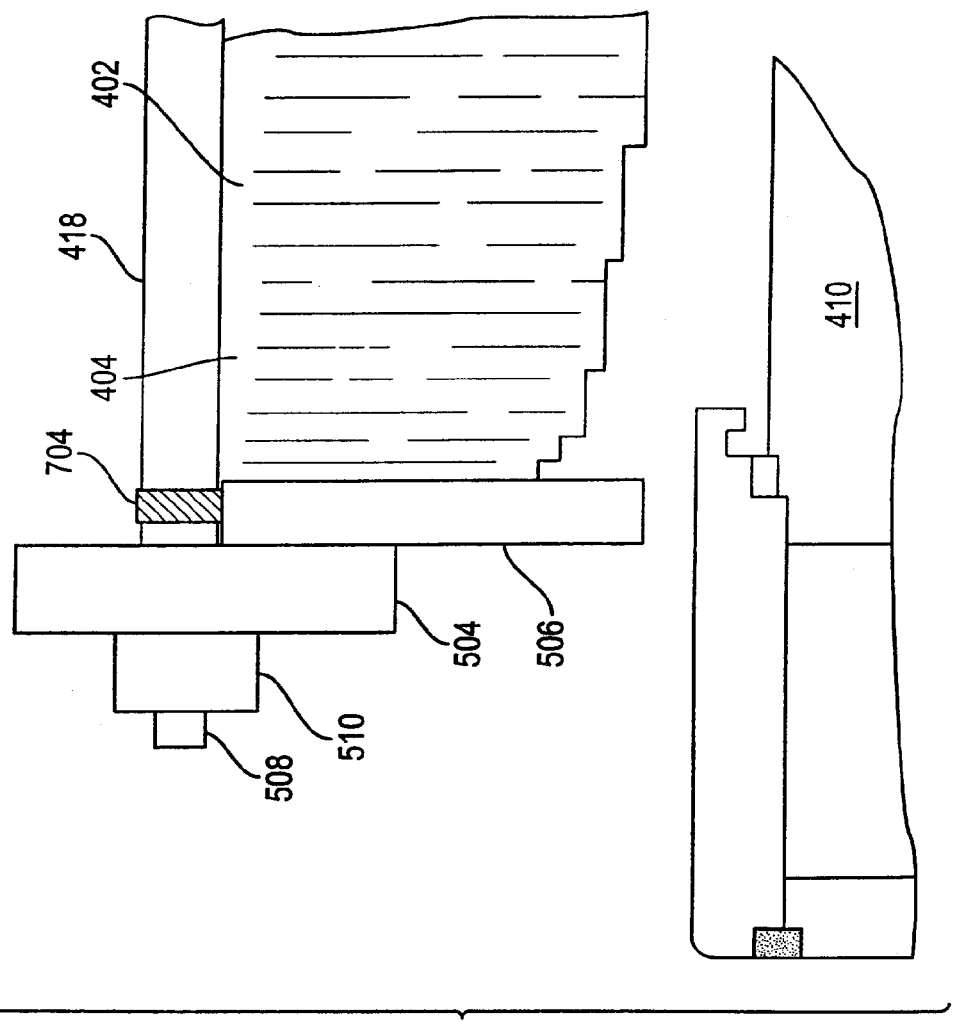

What is claimed is:

1. A thermal control and keybar voltage differential reduction mechanism for use in a power generator having a stator, a rotor rotatably disposed in the stator, and a plurality of keybars, the thermal control and keybar voltage differential reduction mechanism comprising a keybar coupler capable of being electrically coupled to each of a first keybar of the plurality of keybars and a second keybar of the plurality of keybars through a flexible electrically conductive linking apparatus, and wherein when the rotor rotates in the stator, the coupler provides a low resistance electrical path from the first keybar to the second keybar for a current induced by the rotation of the rotor.

2. The thermal control and keybar voltage differential reduction mechanism of claim 1, wherein the coupler comprises:
   a first electrical conductor that is electrically coupled to the first keybar;
   a second electrical conductor that is electrically coupled to the second keybar; and
   a flexible electrically conductive linking apparatus coupled to each of the first electrical conductor and the second electrical conductor.

3. The thermal control and keybar voltage differential reduction mechanism of claim 2, wherein each of the first and second electrical conductors is a ring that is affixed near a respective end of the first keybar and the second keybar.

4. The thermal control and keybar voltage differential reduction mechanism of claim 2, wherein each of the electrical conductors are coupled to a respective keybar via a brazed connection.

5. The thermal control and keybar voltage differential reduction mechanism of claim 2, wherein each of the first and second electrical conductors comprise copper conductors.

6. The thermal control and keybar voltage differential reduction mechanism of claim 1, wherein the flexible electrically conductive linking apparatus comprises a braided copper wire.

7. The thermal control and keybar voltage differential reduction mechanism of claim 1, wherein the flexible electrically conductive linking apparatus comprises a chain of copper links.

8. A thermal control and keybar voltage differential reduction mechanism for use in a power generator having a stator, a rotor rotatably disposed in the stator, and a plurality of keybars, the thermal control and keybar voltage differential reduction mechanism comprising a keybar coupler capable of being electrically coupled to each of a first keybar of the plurality of keybars and a second keybar of the plurality of keybars, the keybar coupler comprising an electrically conductive rod that is inserted in a respective diametric aperture in the first keybar and the second keybar, and wherein when the rotor rotates in the stator, the coupler provides a low resistance electrical path from the first keybar to the second keybar for a current induced by the rotation of the rotor.

9. A keybar assembly comprising:
   a plurality of keybars;
   a flexible electrically conductive coupler that is electrically coupled to each of a first keybar of the plurality of keybars and a second keybar of the plurality of keybars; and
   wherein the electrically conductive coupler provides a low electrical resistance path between the first keybar and the second keybar.

10. The keybar assembly of claim 9, wherein the keybar coupler comprises:
    a first electrical conductor that is electrically coupled to the first keybar;
    a second electrical conductor that is electrically coupled to the second keybar; and
    a flexible electrically conductive linking apparatus coupled to each of the first electrical conductor and the second electrical conductor.

11. The keybar assembly of claim 10, wherein each of the first and second electrical conductors is a ring that are affixed to an end of each of the first and the second keybars.

12. The keybar assembly of claim 10, wherein the flexible electrically conductive linking apparatus comprises a braided copper wire.

13. The keybar assembly of claim 10, wherein the flexible electrically conductive linking apparatus comprises a chain of copper links.

14. The keybar assembly of claim 10, wherein each of the electrical conductors are electrically coupled to a respective keybar via a brazed connection.

15. The keybar assembly of claim 10, wherein each of the first and second electrical conductors comprise copper conductors.

16. The keybar assembly of claim 9, wherein the coupler comprises an electrically conductive ring disposed between an end of the stator and a power generator flange.

17. The keybar assembly of claim 9, wherein the keybar assembly further comprises a flange coupled to an end of each keybar of the plurality of keybars and wherein the coupler provides a shunt whereby a current in a first keybar of the plurality of keybars can flow to a second keybar of the plurality of keybars, bypassing the flange.

18. A keybar assembly comprising:
    a plurality of keybars;
    an electrically conductive coupler that is electrically coupled to each of a first keybar of the plurality of keybars and a second keybar of the plurality of keybars, the electrically conductive coupler comprising a rod that is inserted in an diametric aperture in each of the first and second keybars; and
    wherein the electrically conductive coupler provides a low electrical resistance path between the first keybar and the second keybar.

19. The keybar assembly of claim 18, wherein the electrical conductive coupler is electrically coupled to the first keybar and the second keybar via brazed connections.

20. The keybar assembly of claim 18, wherein the rod comprises a copper rod.

21. A power generator comprising:
    an approximately cylindrically-shaped stator comprising a stator core, an inner surface, an outer surface, a proximal end, and a distal end;

a rotor rotatably disposed inside of the stator;

a plurality of keybars axially disposed adjacent to the outer surface of the stator;

a keybar coupler coupled to each of a first keybar of the plurality of keybars and a second keybar of the plurality of keybars, the keybar coupler comprising:

a first electrical conductor that is electrically coupled to the first keybar;

a second electrical conductor that is electrically coupled to the second keybar; and a flexible electrically conductive linking apparatus coupled to each of the first electrical conductor and the second electrical conductor;

wherein a rotation of the rotor produces a keybar current in the first keybar and wherein the keybar coupler permits the keybar current to flow to the second keybar.

22. The power generator of claim 21, wherein each of the first and second electrical conductors comprises a ring that is affixed near a respective end of the first keybar and the second keybar.

23. The power generator of claim 21, wherein the keybar current induces a first magnetic field in the power generator that opposes a second magnetic field induced in the power generator by the rotation of the rotor.

24. The power generator of claim 21, wherein the power generator further comprises a flange coupled to an end of each of the first keybar and the second keybar and wherein the keybar coupler provides a shunt whereby the keybar current bypasses the flange.

25. The power generator of claim 21, wherein the flexible electrically conductive linking apparatus comprises a braided copper wire.

26. The power generator of claim 21, wherein the flexible electrically conductive linking apparatus comprises a chain of copper links.

27. The power generator of claim 21, wherein each of the electrical conductors are electrically coupled to a respective keybar via a brazed connection.

28. The power generator of claim 21, wherein each of the first and second electrical conductors comprise copper conductors.

29. A method for reducing a temperature of, and a voltage differential in, a power generator, wherein the power generator comprises a stator having an outer surface, a rotor that is rotatably disposed inside of the stator, and a plurality of axially oriented keybars circumferentially disposed around the outer surface of the stator, the method comprises the steps of:

flexibly and electrically coupling a first keybar of the plurality of keybars to a second keybar of the plurality of keybars by a flexible keybar coupler;

allowing a current to flow from the first keybar to the second keybar via the keybar coupler in response to a rotation of the rotor to produce a multiple keybar current;

producing a first magnetic field based on the multiple keybar current; and wherein the rotation of the rotor induces a second magnetic field in the stator, which second magnetic field is opposed by the first magnetic field produced by the multiple keybar current.

30. The method of claim 29, wherein the flexible keybar coupler comprises a braided copper wire.

31. The method of claim 29, wherein the flexible keybar coupler comprises a chain of copper links.

32. The method of claim 29, wherein the step of flexibly and electrically coupling comprises the steps of:

brazing the flexible keybar coupler to the first keybar; and brazing the flexible keybar coupler to the second keybar.

33. The method of claim 29, wherein the flexible keybar coupler comprises a copper conductor.

34. A power generator comprising:

an approximately cylindrically-shaped stator comprising a stator core, an inner surface, an outer surface, a proximal end, and a distal end;

a rotor rotatably disposed inside of the stator;

a plurality of keybars axially disposed adjacent to the outer surface of the stator;

a keybar coupler coupled to each of a first keybar of the plurality of keybars and a second keybar of the plurality of keybars, the keybar coupler comprising a rod that is inserted in a respective diametric aperture in the first keybar and the second keybar;

wherein a rotation of the rotor produces a keybar current in the first keybar and wherein the keybar coupler permits the keybar current to flow to the second keybar.

35. A method for reducing an operating temperature of a power generator that comprises a stator housing a rotor that is rotatably disposed in the stator and that further comprises a plurality of keybars that are adjacent to an outside surface of the stator and that are coupled together at an end of each keybar of the plurality of keybars by a flange, the method comprising the steps of:

flexibly and electrically coupling a first keybar of the plurality of keybars to a second keybar of the plurality of keybars by a flexible keybar coupler; and shunting a current in the first keybar from the first keybar to the second keybar via the keybar coupler, bypassing the flange.

36. The method of claim 35, further comprising steps of:

rotating the rotor;

inducing a current in the first keybar in response to the rotation of the rotor; and wherein the step of shunting a current comprises a step of shunting the current induced in the first keybar from the first keybar to the second keybar via the keybar coupler, bypassing the flange.

37. The method of claim 35, wherein the flexible keybar coupler comprises a braided copper wire.

38. The method of claim 35, wherein the flexible keybar coupler comprises a chain of copper links.

39. The method of claim 35, wherein the step of flexibly and electrically coupling comprises the steps of:

brazing the flexible keybar coupler to the first keybar; and brazing the flexible keybar coupler to a second keybar.

40. A method of claim 35, wherein the flexible keybar coupler comprises a copper conductor.

41. A thermal control and keybar voltage differential reduction mechanism for use in a power generator having a stator, a rotor rotatably disposed in the stator, and a plurality of keybars, the thermal control and keybar voltage differential reduction mechanism comprising a keybar coupler capable of being electrically coupled to each of a first keybar of the plurality of keybars and a second keybar of the plurality of keybars through a thermally conductive and electrically conductive ring disposed between an end of the stator and a power generator flange, wherein the conductive ring is in thermal communication with the flange for transferring heat from the stator to the flange, and wherein when the rotor rotates in the stator, the coupler provides a low resistance electrical path from the first keybar to the second keybar for a current induced by the rotation of the rotor.

42. The power generator of claim 41, wherein the thermally and electrically conductive ring comprises a copper ring.

43. A power generator comprising:
an approximately cylindrically-shaped stator comprising a stator core, an inner surface, an outer surface, a proximal end, and a distal end;
a rotor rotatably disposed inside of the stator;
a plurality of keybars axially disposed adjacent to the outer surface of the stator;
a keybar coupler coupled to each of a first keybar of the plurality of keybars and a second keybar of the plurality of keybars, the keybar coupler comprising a thermally conductive and electrically conductive ring disposed between an end of the stator and a power generator flange, the conductive ring being in thermal communication with the flange for transferring heat from the stator to the flange;
wherein a rotation of the rotor produces a keybar current in the first keybar and wherein the keybar coupler permits the keybar current to flow to the second keybar.

44. The power generator of claim 43, wherein the thermally conductive and electrically conductive ring is coupled to each of the first and second keybars of the plurality of keybars via a brazed connection.

45. The keybar assembly of claim 43, wherein the thermally conductive and electrically conductive ring comprises a copper ring.

* * * * *

UNITED STATES PATENT AND TRADEMARK OFFICE
CERTIFICATE OF CORRECTION

PATENT NO. : 6,429,567 B1
DATED : August 6, 2002
INVENTOR(S) : Manoj Ramprasad Shah et al.

It is certified that error appears in the above-identified patent and that said Letters Patent is hereby corrected as shown below:

Title page,
Showing the illustrative Figure should be deleted and substitute with the attached title page.

Drawings,
Sheets 1 through 14, Figures 1 through 14 have been replaced with those attached.

Column 3,
Line 12, "the rotation" has been replaced with -- by the rotation --.

Column 12,
Line 51, "A" has been replaced with -- The --.

Signed and Sealed this

Twenty-sixth Day of November, 2002

Attest:

Attesting Officer

JAMES E. ROGAN
Director of the United States Patent and Trademark Office

United States Patent
Shah et al.

(10) Patent No.: US 6,429,567 B1
(45) Date of Patent: Aug. 6, 2002

(54) POWER GENERATOR

(75) Inventors: Manoj Ramprasad Shah, Latham; Sameh Ramadan Salem, Rexford; Ronald Irving Longwell, Ballston Lake, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/748,911

(22) Filed: Dec. 27, 2000

(51) Int. Cl.[7] ............................................. H02K 1/12
(52) U.S. Cl. ....................... 310/197; 310/258; 310/259; 310/64
(58) Field of Search ................................ 310/254, 256, 310/258, 259, 217, 91, 197, 64

(56) References Cited

U.S. PATENT DOCUMENTS 3,987,325 A * 10/1976 Wilson et al. ............ 310/197
5,869,912 A    2/1999  Andrew et al.
6,025,666 A    2/2000  Kliman
6,104,116 A    8/2000  Fuller et al.
6,127,761 A   10/2000  Shen et al.

FOREIGN PATENT DOCUMENTS

JP           57-78334     *  5/1982   ............. H02K/1/18

* cited by examiner

Primary Examiner—Burton S. Mullins
(74) Attorney, Agent, or Firm—Banner & Witcoff

(57) ABSTRACT

A thermal control and keybar voltage differential reduction mechanism is provided for use in a power generator having multiple keybars that are each coupled to a flange. The mechanism includes an electrically conductive coupler capable of being electrically coupled to each of a first keybar and a second keybar of the multiple keybars. The coupler facilitates a flow of a current from the first keybar to the second keybar in response to a rotation of a rotor of the power generator, shunting the current away from the flange and producing a first magnetic field that opposes a second magnetic field induced by the rotation of the rotor.

45 Claims, 14 Drawing Sheets

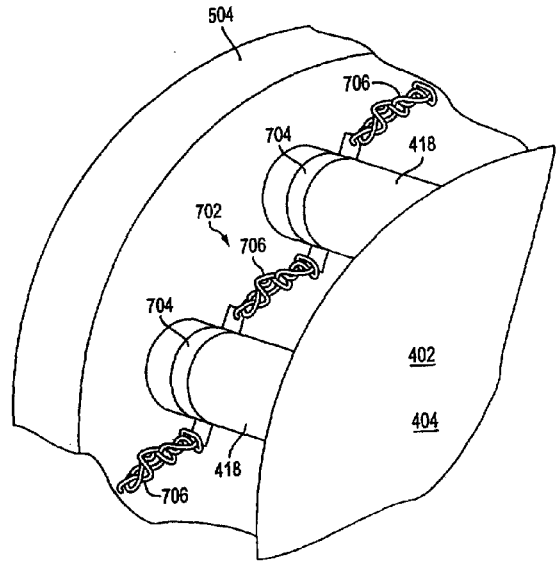

FIG. 8